US010817205B2

(12) United States Patent
Nakamura et al.

(10) Patent No.: US 10,817,205 B2
(45) Date of Patent: Oct. 27, 2020

(54) COMPUTER SYSTEM AND STORAGE DEVICE

(71) Applicant: HITACHI, LTD., Tokyo (JP)

(72) Inventors: Takaki Nakamura, Tokyo (JP); Hideo Saito, Tokyo (JP); Ken Nomura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 59 days.

(21) Appl. No.: 16/118,014

(22) Filed: Aug. 30, 2018

(65) Prior Publication Data

US 2019/0265904 A1    Aug. 29, 2019

(30) Foreign Application Priority Data

Feb. 28, 2018   (JP) .................................. 2018-034321

(51) Int. Cl.
*G06F 3/00* (2006.01)
*G06F 3/06* (2006.01)

(52) U.S. Cl.
CPC .......... *G06F 3/0647* (2013.01); *G06F 3/0604* (2013.01); *G06F 3/0644* (2013.01); *G06F 3/0673* (2013.01)

(58) Field of Classification Search
CPC ............................... G06F 3/0647; G06F 3/065
USPC ........................................................ 711/165
See application file for complete search history.

(56) References Cited

U.S. PATENT DOCUMENTS

| 2014/0289205 | A1 | 9/2014 | Shigeta |
| 2015/0371690 | A1* | 12/2015 | Amarilio ............. G11C 7/1075 710/316 |
| 2017/0277443 | A1 | 9/2017 | Deguchi et al. |

FOREIGN PATENT DOCUMENTS

| JP | 2014-186652 A | 10/2014 |
| JP | 2015-118472 A | 6/2015 |
| WO | WO 2015/186248 A1 | 12/2015 |
| WO | WO 2017/046864 A1 | 3/2017 |

OTHER PUBLICATIONS

Office Action, dated Jul. 7, 2020, which issued during the prosecution of Japanese Application No. 2018-034321, which corresponds to the present application (with English translation).

* cited by examiner

*Primary Examiner* — Jae U Yu
(74) *Attorney, Agent, or Firm* — Baker Botts L.L.P.

(57) ABSTRACT

Processing efficiency of a computer using a volume and processing efficiency of another computer using another volume corresponding to the volume can be maintained at high levels. In a computer system, a storage apparatus is able to provide a certain volume to a computer, and another storage apparatus provides data to the computer by causing a virtualization function to point to another volume from the certain volume and copying data from the other volume to the certain volume. An upper limit on the number of pages copiable from the other volume to the certain volume of the storage apparatus is set. A CPU of the other storage apparatus copies data in an amount equal to or smaller than the upper limit from a page among multiple pages of the other volume to a storage region corresponding to a page forming the certain volume of the storage apparatus.

9 Claims, 21 Drawing Sheets

FIG.5

COPY SOURCE VOLUME MAPPING MANAGEMENT TABLE 391

| LUN 501 | COPY DESTINATION STORAGE 502 | COPY DESTINATION LUN 503 | COPY DESTINATION SWITCHIHG FLAG 504 | NUMBER OF COPIED PAGES 505 | SWITCHING ON RECORD 506 |
|---|---|---|---|---|---|
| 0 | 10.100.235.11 | 0 | ON | 5 | 2015/12/19 0:00 – 2015/12/31 23:59, 2016/12/20 0:00 – 2016/12/30 23:59, 2017/12/18 0:00 – |
| 1 | 10.100.235.11 | 1 | OFF | 0 | |
| ... | ... | ... | ... | ... | ... |

FIG.6

COPY DESTINATION VOLUME MAPPING MANAGEMENT TABLE 491

| LUN 511 | COPY SOURCE STORAGE 512 | COPY SOURCE LUN 513 | COPY DESTINATION SWITCHING FLAG 514 | NUMBER OF COPIED PAGES 515 |
|---|---|---|---|---|
| 0 | 10.100.234.10 | 0 | ON | 5 |
| 1 | 10.100.234.10 | 1 | OFF | 0 |
| 2 | 10.210.123.10 | 0 | OFF | 0 |
| ... | ... | ... | ... | ... |

FIG.7

ACCESS MANAGEMENT TABLE

| LUN | LOGICAL PAGE NUMBER | NUMBER OF TIMES OF READING | NUMBER OF TIMES OF WRITING |
|---|---|---|---|
| 0 | 0 | 100 | 200 |
| 0 | 1 | 114 | 142 |
| 0 | 2 | 3000 | 0 |
| ... | ... | ... | ... |
| 1 | 0 | 0 | 1000 |
| 1 | 1 | 3 | 2 |
| 1 | 2 | 0 | 0 |
| ... | ... | ... | ... |
| 2 | 0 | 10 | 0 |
| ... | ... | ... | ... |

FIG.9

COPY SOURCE VOLUME STATE MANAGEMENT TABLE 394

| LOGICAL PAGE NUMBER (801) | PHYSICAL PAGE NUMBER (802) | COPIED PAGE FLAG (803) | POST-COPY UPDATE FLAG (804) |
|---|---|---|---|
| 0 | 1 | ON | OFF |
| 1 | 5 | ON | OFF |
| 2 | 8 | OFF | N/A |
| 3 | 3 | ON | ON |
| ... | ... | ... | ... |

FIG.10

COPY DESTINATION VOLUME STATE MANAGEMENT TABLE 494

| LOGICAL PAGE NUMBER (811) | PHYSICAL PAGE NUMBER (812) | COPIED PAGE FLAG (813) | DIFFERENTIAL FLAG (814) |
|---|---|---|---|
| 0 | 2 | ON | ON |
| 1 | 4 | ON | OFF |
| 2 | N/A | OFF | N/A |
| 3 | N/A | OFF | N/A |
| ... | ... | ... | ... |

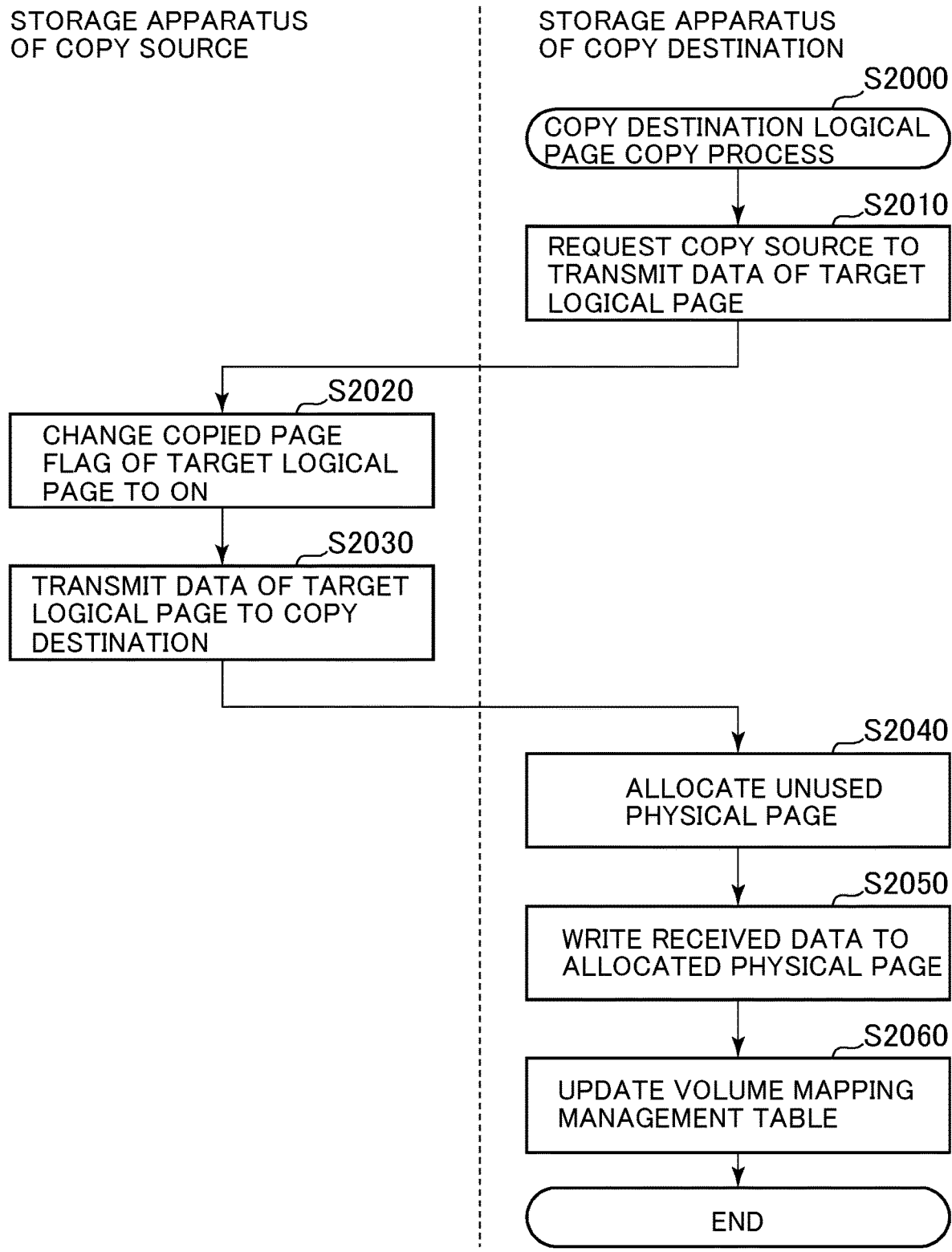

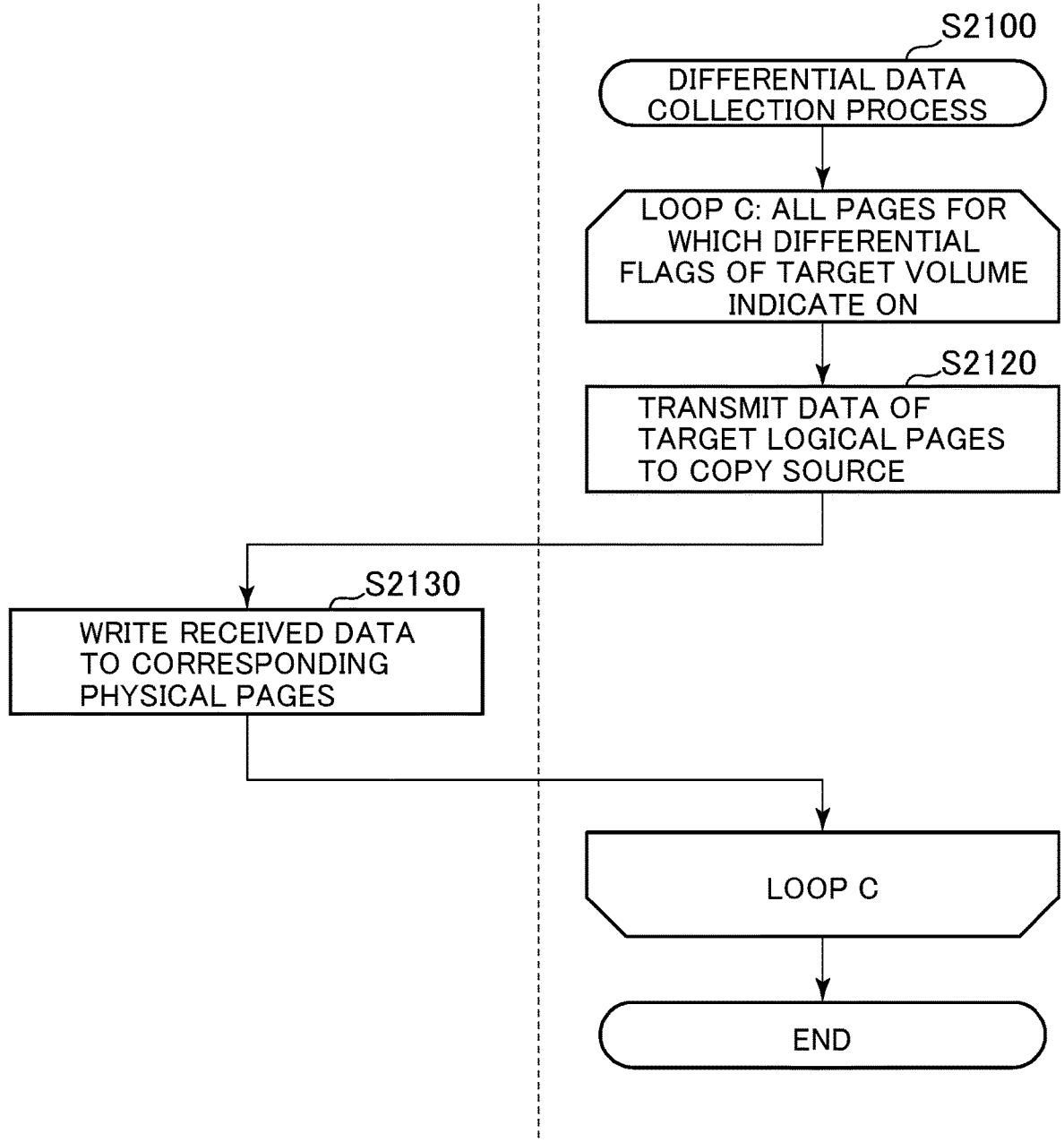

COMPUTER SYSTEM AND STORAGE DEVICE

CLAIM OF PRIORITY

The present application claims benefit of priority to Japanese Patent Application No. 2018-034321, filed on Feb. 28, 2018, the content of which is hereby incorporated by reference into this application.

BACKGROUND

The present invention relates to a technique for enabling a storage apparatus to provide, to a computer, a volume corresponding to a volume able to be provided by another storage apparatus to another computer.

There is a deployment model called cloud bursting (also merely referred to as bursting) in which if a computational resource of a private cloud is insufficient, a computational resource of a public cloud is temporarily used. In order to execute the cloud bursting, it is necessary to migrate data required for a task from the private cloud to the public cloud. However, for a task for which a large amount of data is handled, it has taken time to migrate the data and it has been difficult to use the cloud bursting.

For example, according to a technique described in International Publication No. WO2015-186248, migration is made unnecessary by applying a volume virtualization function, generating, in a private cloud, a virtual volume pointing to a volume included in a public cloud, and retaining, in the public cloud, the latest data to be used for a task. If a failure occurs in the private cloud, it is possible to take over the task in the public cloud.

When the technique described in International Publication No. WO2015-186248 is applied to the bursting, the following problems occur. First, if the bursting is not executed, all data is retained in the public cloud regardless of being unused, and extra billing occurs for retaining data in the public cloud. Even if the bursting is executed, data that is likely to be unused during the execution is stored in the public cloud, the efficiency of storing the data in the public cloud is low, and extra billing occurs.

In addition, for example, according to a technique described in International Publication No. WO2017-046864, migration is efficiently executed by using push migration and pull migration. A large-capacity file that is accessed at a low frequency is migrated by the push migration, while a small-capacity file that is accessed at a high frequency is migrated by the pull migration.

When the technique described in International Publication No. WO2017-046864 is applied to the bursting, similar problems occur. If the bursting is not executed, a large amount of data is held in a migration destination due to the push migration, and extra billing occurs. In addition, if the bursting is executed, a large-capacity file that is unlikely to be used and is accessed at a low frequency is held in the migration destination due to the push migration, the efficiency of storing data in a public cloud is low, and extra billing occurs. In addition, data that is likely to be unused during the execution of a task in the public cloud is stored in the public cloud, the efficiency of storing data in the public cloud is low, and extra billing occurs.

SUMMARY

For example, according to the technique described in International Publication No. WO2015-186248, if a task is executed in the private cloud, data needs to be read from the public cloud, and there is a problem that processing efficiency in a normal state in which the bursting is not executed is low.

In addition, according to the technique described in International Publication No. WO2017-046864, if the execution of a task is attempted in the public cloud, the frequency at which data is read from the private cloud may increase, and processing efficiency may be reduced.

The invention has been made under such circumstances, and an object of the invention is to provide a technique for maintaining, at high levels, processing efficiency of a computer using a certain volume and processing efficiency of another computer using another volume corresponding to the certain volume.

In order to achieve the aforementioned object, a computer system according to an aspect includes a first storage apparatus that provides a first volume to a first computer. A second storage apparatus is able to provide a second volume to a second computer. The first storage apparatus provides data to the second computer by causing a virtualization function to point to the first volume from the second volume and copying the data from the first volume to the second volume. An upper limit on the amount of data copiable from the first volume of the first apparatus to the second volume of the second storage apparatus is set. A processor unit of the first storage apparatus copies data in an amount equal to or smaller than the upper limit from a page among multiple pages forming the first volume to a storage region corresponding to a page forming the second volume of the second storage apparatus.

According to the invention, processing efficiency of a computer using a certain volume and processing efficiency of another computer using a volume corresponding to the certain volume can be maintained at high levels.

BRIEF DESCRIPTION OF THE DRAWINGS

FIG. 5 is a diagram showing a configuration of a copy source volume mapping management table according to the embodiment;

FIG. 6 is a diagram showing a configuration of a copy destination volume mapping management table according to the embodiment;

FIG. 7 is a diagram showing a configuration of a copy source access management table and a configuration of a copy destination access management table according to the embodiment;

FIG. 9 is a diagram showing a configuration of a copy source volume state management table according to the embodiment;

FIG. 10 is a diagram showing a configuration of a copy destination volume state management table according to the embodiment;

FIG. 22 is a flowchart of a copy destination logical page copy process according to the embodiment; and FIG. 23 is a flowchart of a differential data collection process according to the embodiment.

DETAILED DESCRIPTION

An embodiment is described with reference to the accompanying drawings. The embodiment described below does not limit the invention according to the appended claims, and all elements described in the embodiment and all combinations of the elements described in the embodiment may not be necessarily required for the elements described in Summary.

The following describes information represented by an "AAA table", but the information may be represented by an arbitrary data structure. Specifically, in order to indicate that the information does not depend on the data structure, the "AAA table" can be referred to as "AAA information".

In addition, in the following description, a "processor unit" includes at least one processor. Typically, the at least one processor is a central processing unit (CPU). The processor may include a hardware circuit that executes a part or all of processes.

In addition, the following describes processes for which "programs" are used as subjects of operations in some cases. A program may be executed by the processor (for example, the CPU) to execute a predetermined process using either or both of a storage resource (for example, a memory) and a communication device (for example, a port), and a subject of the process may be the processor. The processes for which the programs are used as the subjects of the operations may be executed by a device including the processor. In addition, the device may include the hardware circuit that executes a part or all of the processes to be executed by the processor. The computer programs may be installed in the device from a program source. The program source may be a program distributing server or a computer-readable storage medium.

First, a computer system according to the embodiment of the invention is described below.

Figure 1:
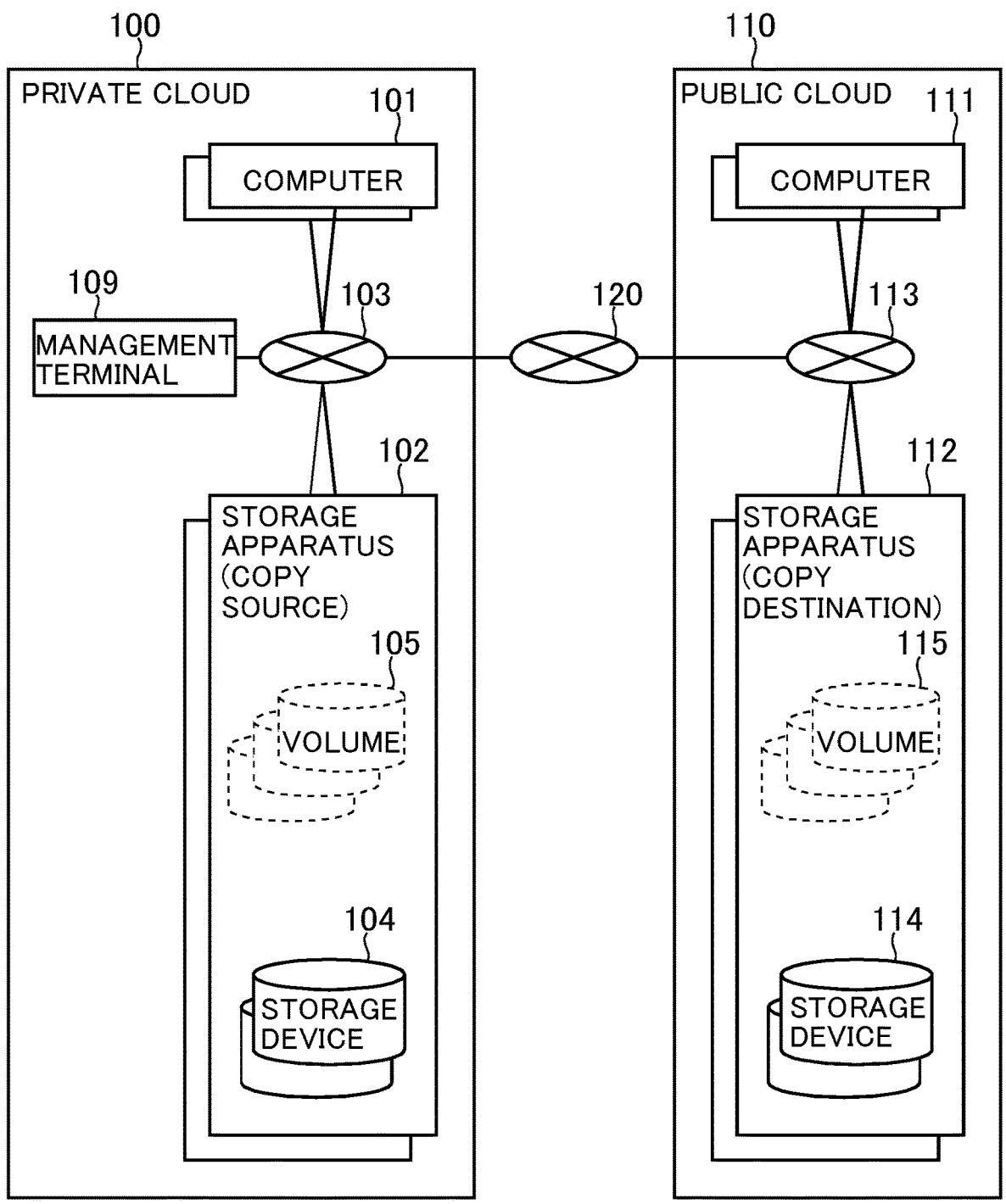
FIG. 1 is a diagram showing an entire configuration of a computer system according to an embodiment.

FIG. 1 is a diagram showing an entire configuration of the computer system according to the embodiment.

The computer system 1 includes a private cloud 100, a public cloud 110, and a wide area network 120 connecting the private cloud 100 and the public cloud 110 to each other. The private cloud 100 includes at least one computer 101 (an example of a first computer), at least one storage apparatus 102 (an example of a first storage apparatus), and a management terminal 109, which are connected to each other via a local area network 103. The management terminal 109 is used by an administrator of the private cloud 100.

The public cloud 110 includes at least one computer 111 (an example of a second computer) and at least one storage apparatus 112 (an example of a second storage apparatus), which are connected to each other via a local area network 113.

At least one storage device 104 is installed in the storage apparatus 102 or installed outside the storage apparatus 102 and connected to the storage apparatus 102. At least one storage device 114 is installed in the storage apparatus 112 or installed outside the storage apparatus 112 and connected to the storage apparatus 112. In the embodiment, the storage apparatus 102 is a copy source (migration source), and the storage apparatus 112 is a copy destination (migration destination).

The storage apparatus 102 provides at least one volume 105 (an example of a first volume) to the computer 101. The storage apparatus 112 provides at least one volume 115 (an example of a second volume) to the computer 111. Each of the volumes 105 and 115 is composed of multiple logical pages. In the embodiment, the sizes of the logical pages are the same as management units of thin provisioning (capacity virtualization) for allocating physical pages to the logical pages upon writing. The sizes of the logical pages may not be the same as the management units of thin provisioning. Multiple physical pages are formed based on storage regions of the storage devices 104 and 114. Physical pages are allocated to the logical pages of the volumes 105 and 115. In the embodiment, the volume 115 is a virtual volume pointing to the volume 105, for example. In this case, data corresponding to a certain logical page that is included in the logical pages of the volume 115 and to which a physical page of the storage device 114 is not allocated is data stored in a physical page allocated to a logical page corresponding to the certain logical page and included in the volume 105.

The computer system 1 shown in FIG. 1 includes the single private cloud 100 and the single public cloud 110, but the invention is not limited to this. The computer system 1 may include multiple private clouds 100 and multiple public clouds 110. In addition, in the computer system 1, the storage apparatus 112 included in the public cloud 110 may be a copy source, and the storage apparatus 102 included in the private cloud 100 may be a copy destination. In addition, the computer system 1 may include only the private cloud 100 or may include only the public cloud 110. If the computer system 1 includes only the private cloud 100 or includes only the public cloud 110, storage apparatuses that serve as a copy source and a copy destination are included in the same cloud.

In addition, in the computer system 1 shown in FIG. 1, the computers 101 (and 111) are separated from the storage apparatuses 102 (and 112). The computer system 1, however, may have a configuration in which each of pairs of the computers 101 (and 111) and the storage apparatuses 102 (and 112) is configured in a single bare metal computer (physical computer). For example, the computer system 1 may have virtual computers that are referred to as virtual machines (VMs) and in which the computers 101 (and 111) and the storage apparatuses 102 (and 112) are operated. Alternatively, the computer system 1 may have containers that are formed by container virtualization and in which the computers 101 (and 111) and the storage apparatuses 102 (and 112) are operated.

Next, a hardware configuration of each of the storage apparatuses 102 (and 112) is described.

Figure 2:
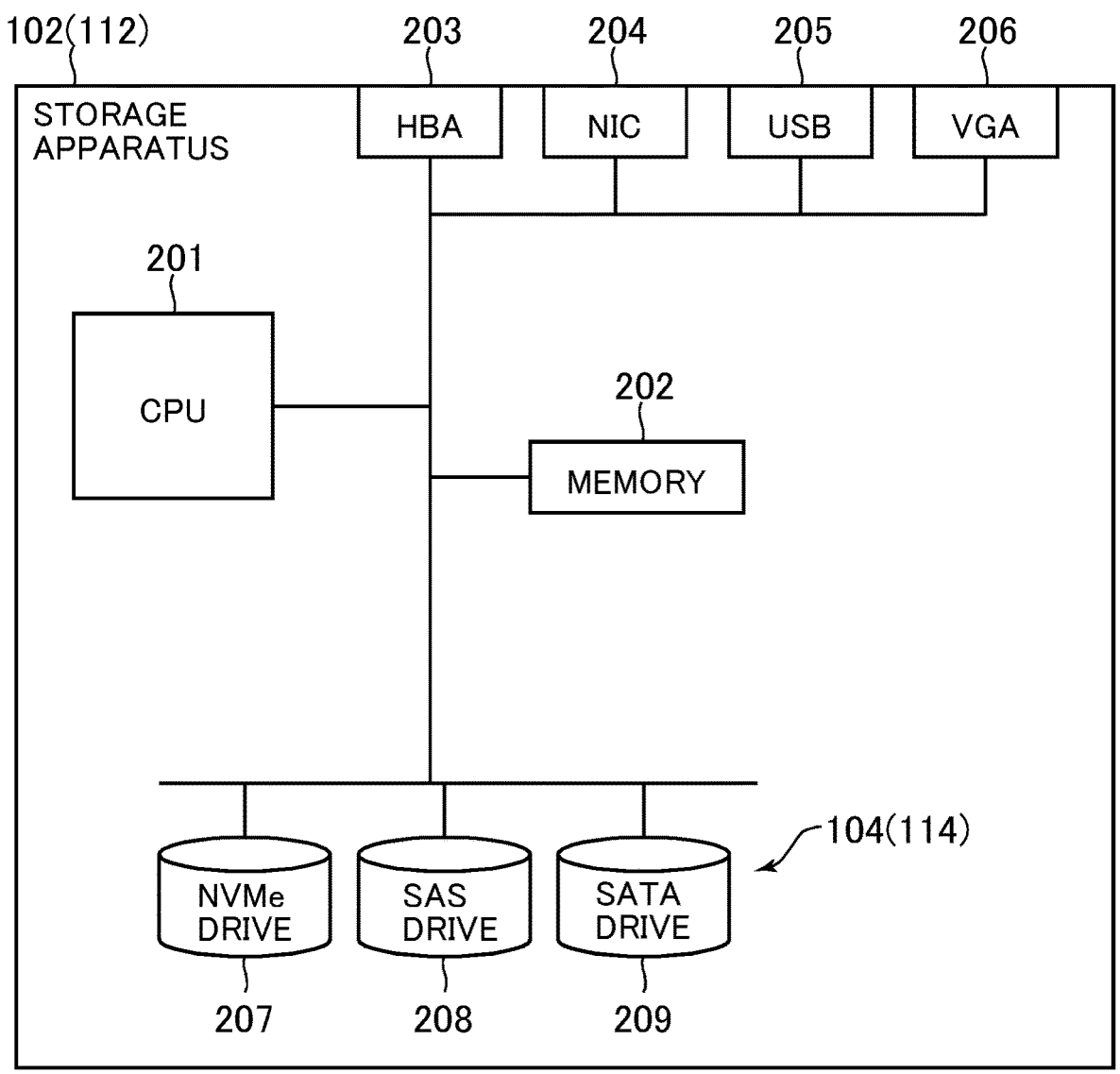
FIG. 2 is a diagram showing a hardware configuration of each of storage apparatuses according to the embodiment.

FIG. 2 is a diagram showing the hardware configuration of each of the storage apparatuses.

In the embodiment, a basic hardware configuration of the storage apparatus 102 included in the private cloud 100 is the same as a basic hardware configuration of the storage apparatus 112 included in the public cloud 110.

Each of the storage devices 102 (and 112) is a computer such as a personal computer (PC) or a server. Each of the storage devices 102 (and 112) includes a central processing unit (CPU) 201 serving as an example of a processor unit, a memory 202, a host bus adapter (HBA) 203, a network interface card (NIC) 204, a Universal Serial Bus (USB) device 205, a Video Graphics Array (VGA) device 206, and the storage device 104 (114). These constituent elements are connected to each other via an internal bus or an external bus. Examples of each of the storage devices 104 (and 114) are a nonvolatile memory express (NVMe) drive 207, a serial attached SCSI (SAS) drive 208, a serial ATA (SATA) drive 209, and an external drive (not shown) connected to the HBA 203.

Next, configurations of memories of the storage apparatus 102 of the copy source are described.

Figure 3:
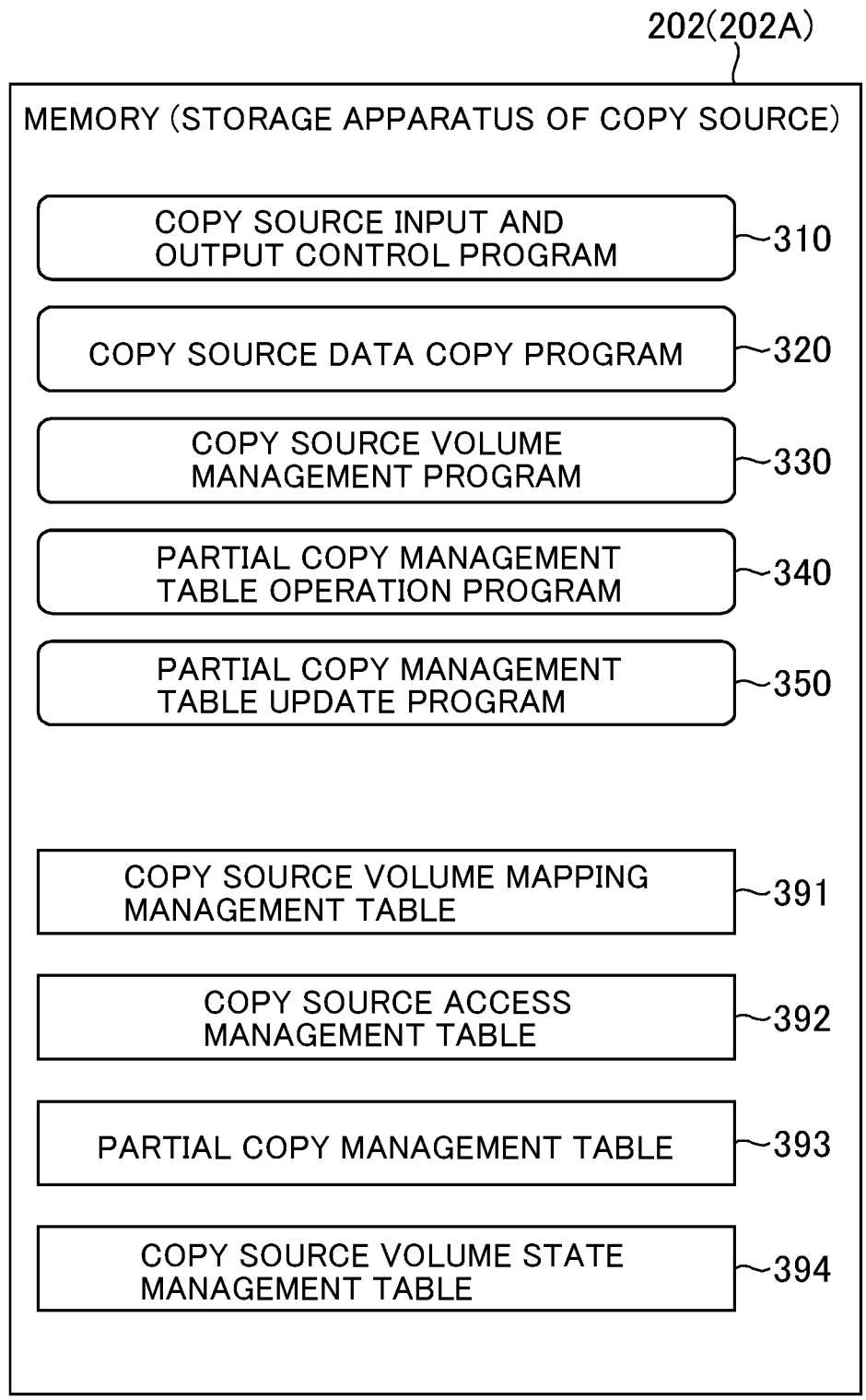
FIG. 3 is a diagram showing configurations of memories of a storage apparatus of a copy source according to the embodiment.

FIG. 3 is a diagram showing the configurations of the memories of the storage apparatus of the copy source according to the embodiment.

The memory 202 of the storage apparatus 102 of the copy source stores a copy source input and output control program 310, a copy source data copy program 320, a copy source volume management program 330, a partial copy management table operation program 340, and a partial copy management table update program 350. In addition, a memory 202A of the storage apparatus 102 stores a copy source volume mapping management table 391, a copy source access management table 392, a partial copy management table 393, and a copy source volume state management table 394. In addition, the memory 202A stores a program (not shown) for achieving a storage service and a table (not shown) for achieving the storage service.

Next, configurations of memories of the storage apparatus 112 of the copy destination are described.

Figure 4:
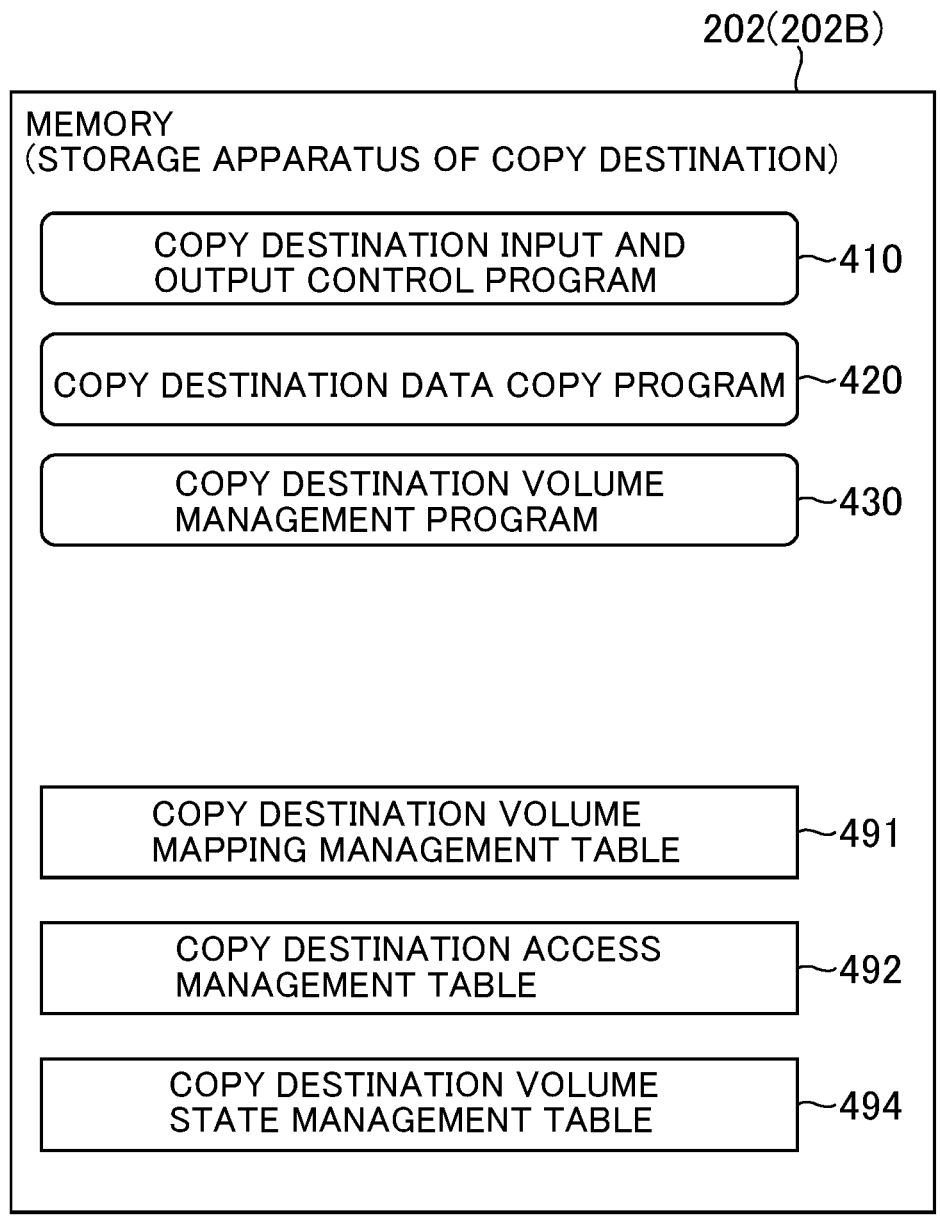
FIG. 4 is a diagram showing configurations of memories of a storage apparatus of a copy destination according to the embodiment.

FIG. 4 is a diagram showing the configurations of the memories of the storage apparatus of the copy destination according to the embodiment.

The memory 202 of the storage device 112 of the copy destination stores a copy destination input and output control program 410, a copy destination data copy program 420, and a copy destination volume management program 430. In addition, a memory 202B of the storage device 112 stores a copy destination volume mapping management table 491, a copy destination access management table 492, and a copy destination volume state management program 494. In addition, the memory 202B stores a program (not shown) for achieving a storage service and a table (not shown) for achieving the storage service.

Next, a configuration of the copy destination volume mapping management table 391 is described.

FIG. 5 is a diagram showing the configuration of the copy destination volume mapping management table according to the embodiment.

The copy destination volume mapping management table 391 stores rows associated with volumes (logical units also referred to as LUs) of the copy source. Each of the rows of the table 391 includes items for a logical unit number (LUN) 501, copy destination storage 502, a copy destination LUN 503, a copy destination switching flag 504, the number of copied pages 505, and a switching ON record 506 as columns.

In the LUN 501, LUNs that identify the volumes of the copy source are stored. In the copy destination storage 502, information (for example, IP address) that identifies the storage apparatus of the copy destination is stored. FIG. 5 assumes that iSCSI (Internet SCSI) IP addresses are stored as the information stored in the copy destination storage 502. The information stored in the copy destination storage 502, however, is not limited to this. It is sufficient if the information stored in the copy destination storage 502 is an ID that is a World Wide Name (WWN) or the like and identifies the storage apparatus of the copy destination. In the copy destination LUN 503, LUNs that identify volumes corresponding to the volumes associated with the rows and managed by the storage apparatus of the copy destination are stored. In the copy destination switching flag 504, flags indicating whether or not the volumes associated with the rows have been switched to the volumes of the copy destination as volumes to be used for a task are stored. If a volume of the copy source is already switched to a volume of the copy destination or if the volume of the copy destination is used by the computer 111 of the public cloud 110, a flag is set to ON. On the other hand, if the volume of the copy source is not switched to the volume of the copy destination or if the volume of the copy source is used by the computer 101 of the private cloud 100, the flag is set to OFF. In the number of copied pages 505, the numbers of logical pages that are among logical pages of the volumes associated with the rows and in which data is already copied to the volumes of the copy destination are stored. In the switching ON record 506, records indicating time when the volumes associated with the rows have been switched to the volumes of the copy destination are stored.

Next, a configuration of the copy destination volume mapping management table 491 is described.

FIG. 6 is a diagram showing the configuration of the copy destination volume mapping management table according to the embodiment.

The copy destination volume mapping management table 491 stores rows associated with the volumes of the copy destination. Each or the rows of the table 491 includes items for an LUN 511, copy source storage 512, a copy source LUN 513, a copy destination switching flag 514, and the number of copied pages 515 as columns.

In the LUN 511, LUNs that identify the volumes of the copy destination are stored. In the copy source storage 512, IP addresses that identify storage apparatuses of the copy source for the volumes of the copy source are stored. In the copy source LUN 513, LUNs that identify the volumes that correspond to the volumes associated with the rows and are managed by the storage apparatuses of the copy source are stored. In the copy destination switching flag 514, flags indicating whether or not the volumes of the copy source are already switched to the volumes associated with the rows as volumes to be used for a task are stored. The flags stored in the copy destination switching flag 514 basically indicate the same meanings as the flags stored in the copy destination switching flag 504. In the number of copied pages 515, the numbers of logical pages in which data is already copied from the volumes of the copy source to the volumes associated with the rows are stored.

Next, a configuration of the copy source access management table 392 and a configuration of the copy destination access management table 492 are described.

FIG. 7 is a diagram showing the configuration of the copy source access management table and the configuration of the copy destination access management table according to the embodiment. Since the configuration of the copy source access management table 392 is the same as or similar to the configuration of the copy destination access management table 492, the copy source access management table 392 and the copy destination access management table 492 are collectively referred to as access management tables.

Each of the access management tables 392 (and 492) stores rows associated with logical pages of a volume. Each row of each of the tables 392 and 492 includes items for an LUN 601, a logical page number 602, the number of times of reading 603, and the number of times of writing 604 as columns. In the LUN 601, LUNs associated with the rows and identifying the volumes managed by the storage apparatus 102 of the copy source are stored. In the logical page number 602, numbers (logical page numbers) that identify logical pages associated with the rows are stored. In the number of times of reading 603, the numbers of times that reading has been executed on the logical pages of the volumes associated with the rows after certain time are stored. In the number of times of writing 604, the numbers of times that writing has been executed on the logical pages of the volumes associated with the rows after the certain time are stored.

In addition, in the rows, amounts of read access to the logical pages of the volumes associated with the rows, amounts of write access to the logical pages of the volumes associated with the rows, elapsed time periods from certain time to time when the logical pages of the volumes associated with the rows have been accessed a predetermined number of times (for example, 10 times), and the like may be stored. In addition, in order to analyze frequencies at which the logical pages are accessed in multiple cycles, rows of the logical pages may be stored for each of the cycles.

Next, a configuration of the partial copy management table 393 is described.

Figure 8:
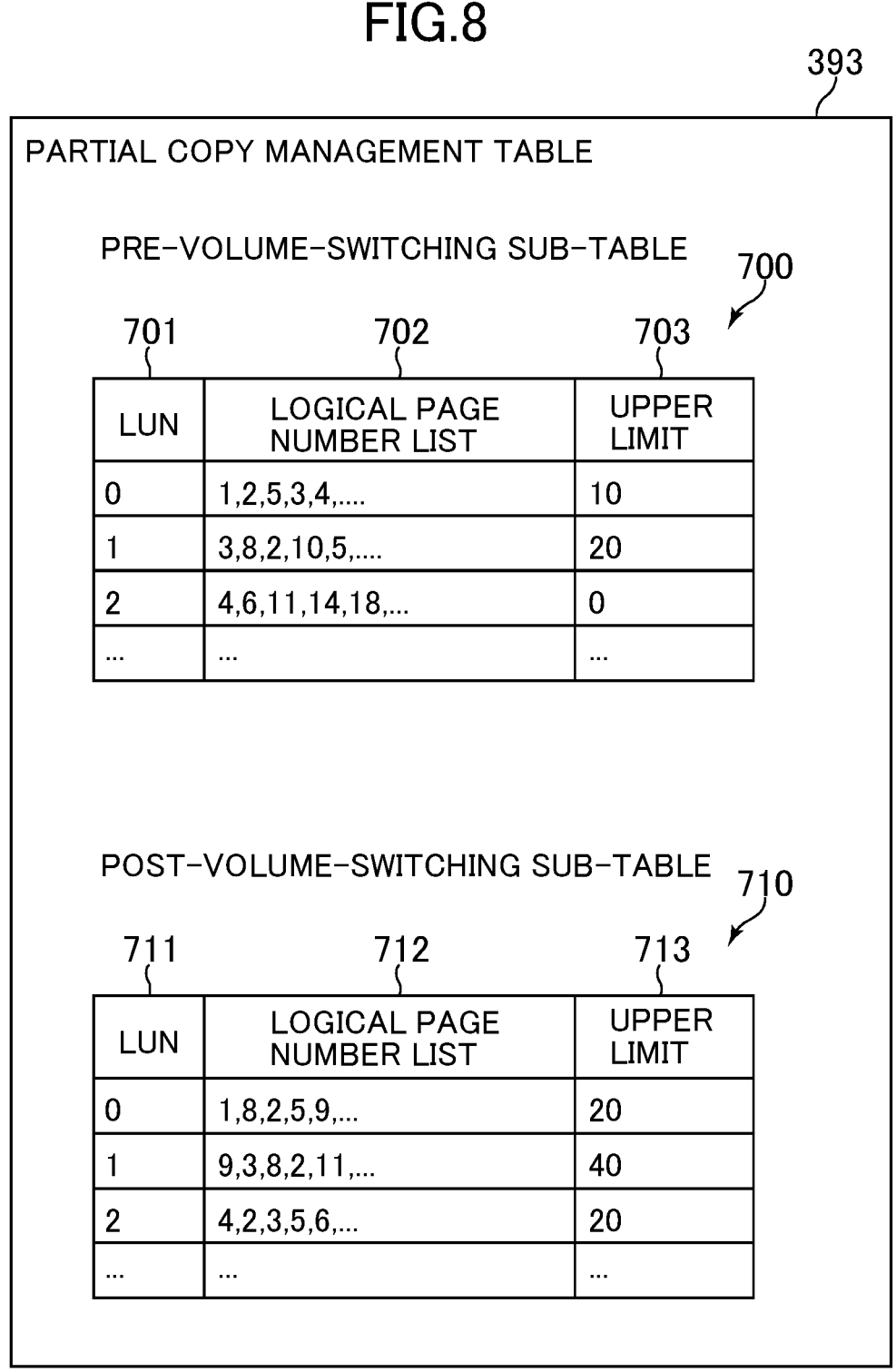
FIG. 8 is a diagram showing a configuration of a partial copy management table according to the embodiment.

FIG. 8 is a diagram showing the configuration of the partial copy management table according to the embodiment.

The partial copy management table 393 includes two sub-tables, a pre-volume-switching sub-table 700 and a post-volume-switching sub-table 710. The pre-volume-switching sub-table 700 is used before a volume to be used is switched from a volume of the copy source to a volume of the copy destination. The post-volume-switching sub-table 710 is used after the volume to be used is switched from the volume of the copy source to the volume of the copy destination. The partial copy management table 393 may include a sub-table to be used before and after the volume to be used is switched from the volume of the copy source to the volume of the copy destination.

The pre-volume-switching sub-table 700 stores rows associated with the volumes of the copy source. Each of the rows of the sub-table 700 includes items for an LUN 701, a logical page number list 702, and an upper limit 703 as columns. In the LUN 701, LUNs that identify the volumes managed by the storage apparatus of the copy source are stored. In the logical page number list 702, information (priority information) on the order in which logical pages to be copied are copied is stored. In an example shown in FIG. 8, logical pages of a volume indicated in a first row and having an LUN 0 are copied in the order of logical page numbers 1, 2, 5, 3, 4, and the like. The priority information is not limited to the order of the logical pages. The priority information may define the order in which multiple groups of logical pages, such as a first priority logical page number group including a set of logical page numbers prioritized first, a second priority logical page number group including a set of logical page numbers prioritized second, and the like, are copied. In the upper limit 703, upper limits (an example of an upper limit) on the numbers of logical pages to be copied are stored. For example, the first row shown in FIG. 8 indicates that copying is terminated after 10 logical pages of the volume having the LUN 0 are copied. Instead of the upper limits on the numbers of logical pages, upper limits of the ratios of the numbers of copiable logical pages to the numbers of all logical pages of the volumes may be stored. The upper limits set in the upper limit 703 are set based on the probability at which cloud bursting is executed. For example, if the probability at which the cloud bursting is executed is low, the upper limits are set to small values. If the probability at which the cloud bursting is executed is zero, the upper limits are set to zero. If the probability at which the cloud bursting is executed is high, the upper limits are set to large values.

The post-volume-switching sub-table 710 stores rows associated with the volumes of the copy source. Each of the rows of the sub-table 710 includes items for an LUN 711, a logical page number list 712, and an upper limit 713 as columns. Information stored in the rows of the post-volume-switching sub-table 710 is the same as or similar to that stored in the rows of the pre-volume-switching sub-table 700.

Next, a configuration of the copy source volume state management table 394 is described.

FIG. 9 is a diagram showing the configuration of the copy source volume state management table according to the embodiment.

A copy source volume state management table 394 is stored in the memory 202A of the copy source for each volume of the copy source. The copy source volume state management table 394 stores rows associated with logical pages of the volume (referred to as target volume in the description of the table 394) associated with this table 394. Each of the rows of the table 394 includes items for a logical page number 801, a physical page number 802, a copied page flag 803, and a post-copy update flag 804 as columns.

In the logical page number 801, numbers that identify the logical pages of the target volume are stored. In this table 394, if the numbers are stored in the rows in ascending order of logical page number, this column 801 may not be included in the rows. In the physical page number 802, numbers (physical page numbers) that identify physical pages allocated to the logical pages associated with the rows of the target volume are stored. Each of the physical numbers corresponds to any of storage regions of the storage device 104. In the copied page flag 803, flags that indicate whether or not the logical pages associated with the rows and included in the target volume are already copied to the copy destination are stored. If a logical page is already copied to the copy destination, a flag is set to ON. If the logical page is not copied to the copy destination, the flag is set to OFF. In the post-copy update flag 804, flags that indicate whether or not the logical pages have been updated after the copy of the logical pages associated with the rows and included in the target volume to the copy destination are stored. If a logical page has been updated (writing) at least once, a flag is set to ON. If the logical page has never been updated, the flag is set to OFF.

Next, a configuration of the copy destination volume state management table 494 is described.

FIG. 10 is a diagram showing the configuration of the copy destination volume state management table according to the embodiment.

A copy destination volume state management table 494 is stored in the memory 202B of the copy destination for each volume of the copy destination. The copy destination volume state management table 494 stores rows associated with logical pages of the volume (referred to as target volume in the description of the table 494) associated with this table 494. Each of the rows of the table 494 includes items for a logical page number 811, a physical page number 812, a copied page flag 813, and a differential flag 814 as columns.

The logical page number 811 indicates numbers that identify the logical pages associated with the rows and included in the target volume. In the embodiment, in the volume of the copy source and the volume of the copy destination, logical pages of the same logical page number correspond to each other. If the numbers are stored in the rows in ascending order of logical page number in this table 494, this column 811 may not be included in the rows. The physical page number 812 indicates numbers that identify physical pages allocated to the logical pages of the target volume. Each of the physical pages corresponds to any of storage regions of the storage device 114 of the storage apparatus 112 of the copy destination. In the copied page flag 813, flags indicating whether or not the logical pages (data of the logical pages) of the copy source are already copied to the logical pages associated with the rows and included in the target volume are stored. If a logical page is already copied to the copy destination, a flag is set to ON. If the logical page is not copied to the copy destination, the flag is set to OFF. If the logical page of the copy source is copied and updated, copied data of the logical page is made invalid and the flag is set to OFF. The copy destination volume stage management table 494 may be configured with only rows indicating copied logical pages. If the copy destination volume stage management table 494 is configured in this manner, the copied page flag 813 may not be included as the column for the rows. In the differential flag 814, flags (differential flags, an example of writing identification information) that indicate whether or not the logical pages associated with the rows and included in the target volume have been updated (writing) in the copy destination after the copy of the logical pages included in the target volume and associated with the rows are stored. If a logical page has been updated in the copy destination at least once, a differential flag is set to ON. If the logical page has never been updated, the differential flag is set to OFF.

Next, processing operations of the computer system 1 according to the embodiment are described.

First, a data partial copy process is described.

Figure 11:
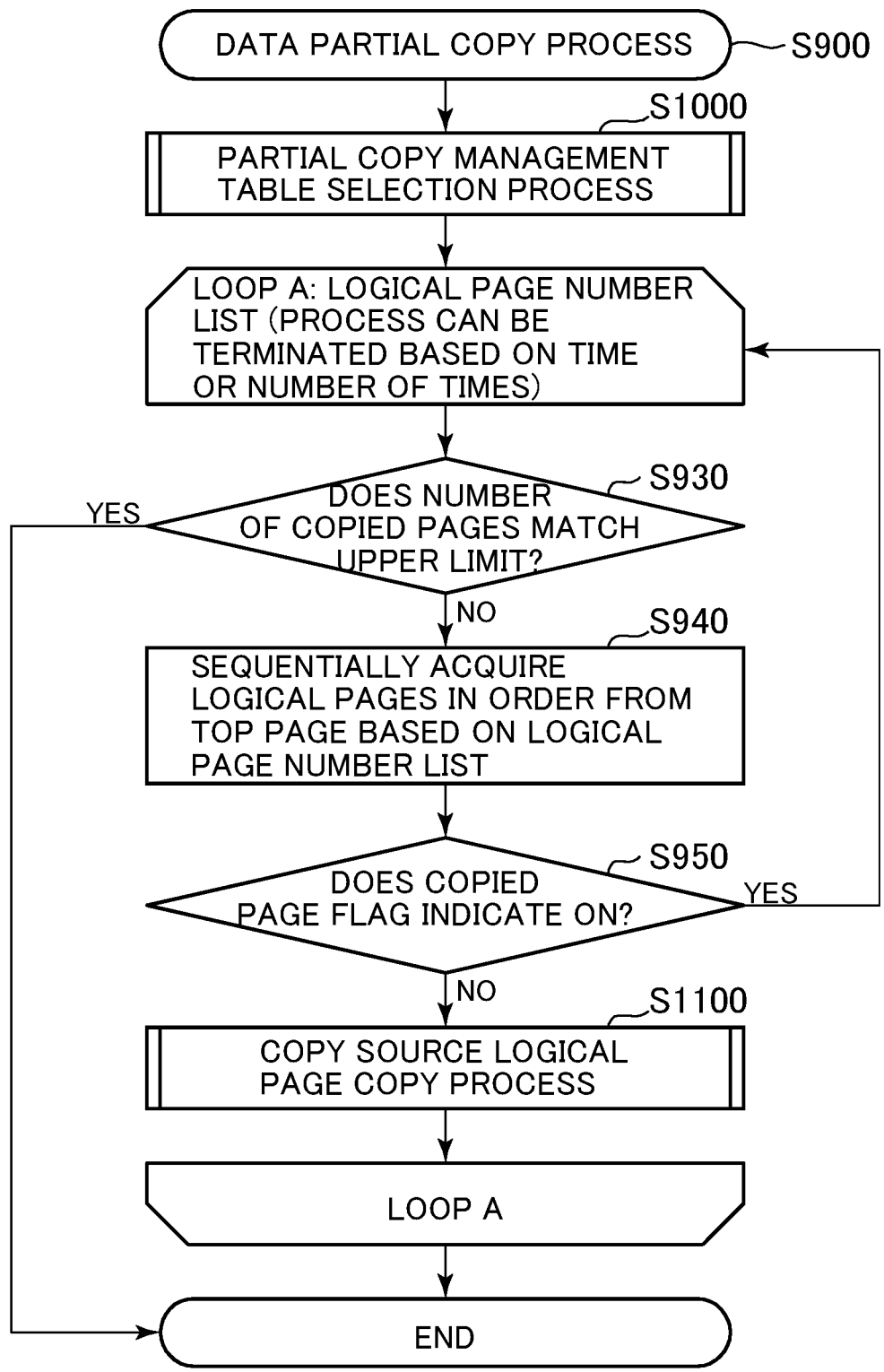
FIG. 11 is a flowchart of a data partial copy process according to the embodiment.

FIG. 11 is a flowchart of the data partial copy process according to the embodiment.

The data partial copy process is executed by the copy source data copy program 320 (specifically, the CPU 201 that executes the copy source data copy program 320 of the storage apparatus 102) of the storage apparatus 102 of the copy source and the copy destination data copy program 420 (specifically, the CPU 201 that executes the copy destination data copy program 420 of the storage apparatus 112) of the storage apparatus 112 of the copy destination.

The data partial copy process is periodically executed on each volume of the copy source after a volume 115 that is a virtual volume corresponding to (pointing to) a volume 105 of the copy source and included in the copy destination is generated in the storage apparatus 112, for example. A volume to be subjected to the data partial copy process is referred to as target volume in the description of the data partial copy process. A method for generating the volume 115 corresponding to the volume 105 can be achieved by a known volume virtualization function.

When the data partial copy process is started (in S900), the copy source data copy program 320 executes a partial copy management table selection process (refer to FIG. 12) (in S1000). In the partial data management table selection process, a sub-table that is to be used and is included in the partial copy management table 393 is selected based on a state of volume switching. If the partial copy management table 393 includes only one sub-table, the sub-table is selected.

Next, the copy source data copy program 320 executes a loop process (in S930, S940, S950, and S1100) of a loop A using a logical page number list (702 or 712) included in the selected sub-table (or the pre-volume-switching sub-table 700 or the post-volume-switching sub-table 710) and indicated in a row associated with the target volume. Basically, the copy source data copy program 320 executes the loop process until the number of copied pages matches an upper limit indicated in the upper limit (703 or 713) included in the sub-table and indicated in the row associated with the target volume. However, if a requirement such as set time or the set number of times is satisfied, the copy source data copy program 320 may terminate the loop process. In this case, the copy source data copy program 320 may execute the loop process until the number of copied pages matches the upper limit indicated in the upper limit (703 or 713) upon the next execution or later execution of the data partial copy process.

In the loop process of the loop A, the copy source data copy program 320 determines whether or not the number of copied logical pages that is indicated in the number of copied pages 505 in the row associated with the target volume in the copy source volume mapping management table 391 matches the upper limit indicated in the upper limit (703 or 713) (in S930). If the number of copied logical pages matches the upper limit as a result of the determination (Yes in S930), this indicates that the maximum number of pages have been copied to the copy destination, and the copy source data copy program 320 terminates the process. On the other hand, if the number of copied logical pages does not match the upper limit (No in S930), the copy source data copy program 320 causes the process to proceed to S940.

The copy source data copy program 320 acquires, from a logical page number list of the logical page number list (702 or 712), a logical page number of the top logical page among logical pages that are not subjected to the loop process, or a logical page number of a logical page having the highest priority (in S940). In the description of the loop process, the top logical page is referred to as target logical page, and the logical page number of the top logical page is referred to as target logical page number.

Next, the copy source data copy program 320 determines whether or not a flag indicated in the copied page flag 803 in a row associated with the target logical page number and included in the copy source volume state management table 394 associated with the target volume indicates ON, thereby determining whether or not data of the target logical page is already copied (in S950).

If the data of the target logical page is already copied as a result of the determination (Yes in S950), the copy source data copy program 320 causes the process to proceed to S930 in order to execute the process on a logical page having the next highest priority. On the other hand, if the data of the target logical page is not copied (No in S950), the copy source data copy program 320 causes the process to proceed to S1110.

The copy source data copy program 320 executes a copy source logical page copy process (refer to FIG. 13) (in S1110) and causes the process to proceed to S930. However, if the requirement for the termination of the loop process of the loop A indicates time, the number of times, or the like and is satisfied, the data partial copy process is terminated.

In the data partial copy process, multiple logical pages (data of the logical pages) of the volume of the copy source can be copied to the volume of the copy destination so that the number of the multiple logical pages is equal to or smaller than the upper limit. As a result, the capacity of the storage device 114 used in the storage apparatus 112 of the copy destination can be relatively suppressed. In addition, since the logical pages are transferred in accordance with priorities, data stored in the storage device 114 is likely to be used in a task process using the volume of the copy destination, and the efficiency of the task process can be improved.

In the data partial copy process shown in FIG. 11, the process of copying data is executed for each page. However, in the data partial copy process shown in FIG. 11, the logical pages to be copied may be extracted and data of the multiple logical pages to be copied may be collectively copied to the copy destination.

Next, the partial copy management table selection process (in S1000) to be called and executed in the data partial copy process is described.

Figure 12:
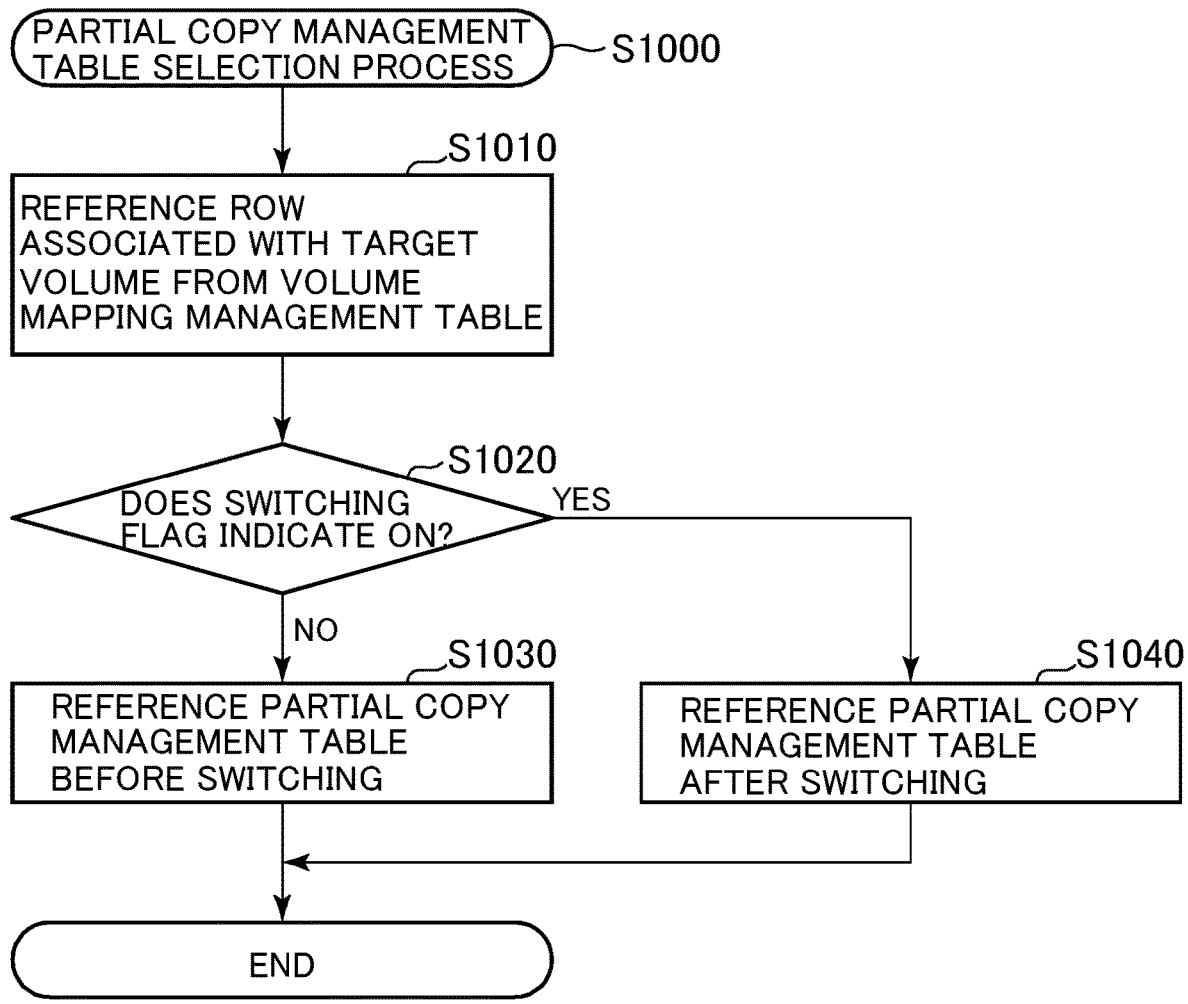
FIG. 12 is a flowchart of a partial copy management table selection process according to the embodiment.

FIG. 12 is a flowchart of the partial copy management table selection process according to the embodiment.

In the partial copy management table selection process, first, the copy source data copy program 320 references a row included in the copy source volume mapping management table 391 and associated with the target volume (same as the target volume described with reference to FIG. 11) (in S1010) and determines whether or not a flag indicated in the copy destination switching flag 504 included in the row indicates ON (in S1020). If the flag does not indicate ON (No in S1020), the flag indicates a state before the volume switching, the copy source data copy program 320 configures setting so that the pre-volume-switching sub-table 700 of the partial copy management table 393 is to be referenced (in S1030), and the copy source data copy program 320 terminates the process. On the other hand, if the flag indicates ON (Yes in S1020), the flag indicates a state after the volume switching, the copy source data copy program 320 configures setting so that the post-volume-switching sub-table 710 of the partial copy management table 393 is to be referenced (in S1040), and the copy source data copy program 320 terminates the process.

In the partial copy management table selection process, the sub-tables included in the partial copy management table 393 can be appropriately switched by determining whether or not a volume to be used for a task has been switched from a volume of the copy source to a volume of the copy destination.

Next, the copy source logical page copy process (in S1100) to be called and executed in the data partial copy process is described.

Figure 13:
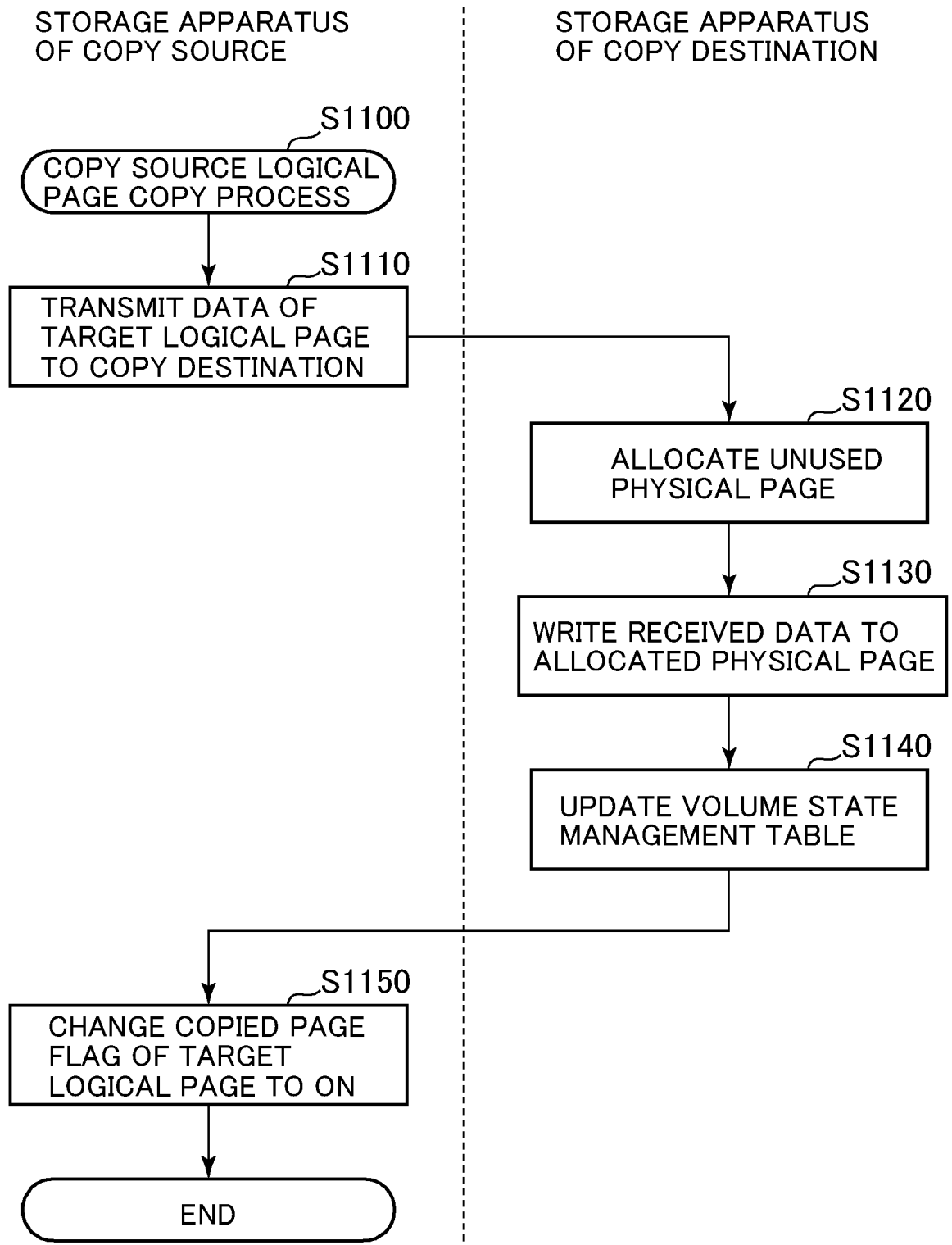
FIG. 13 is a flowchart of a copy source logical page copy process according to the embodiment.

FIG. 13 is a flowchart of the copy source logical page copy process according to the embodiment.

When the copy source logical page copy process is started, the copy source data copy program 320 reads the data of the target logical page (target logical page described with reference to FIG. 11) from the storage device 104 of the storage apparatus 102 of the copy source and transmits the read data to the storage apparatus 112 of the copy destination (in S1110).

Due to this operation, the copy destination data copy program 420 of the storage apparatus 112 of the copy destination allocates an unused physical page of the storage device 114 to store the transmitted data of the target logical page (in S1120). S1120 is executed in the case where the storage apparatus 112 of the copy destination supports thin provisioning.

Next, the copy destination data copy program 420 writes the data received from the copy source and included in the target logical page to the allocated physical page (in S1130). If the storage apparatus 112 of the copy destination does not support thin provisioning, the copy destination data copy program 420 writes the received data to a physical page allocated to a logical page (logical page having the same page number in the embodiment) corresponding to the target logical page and included in the volume of the copy destination.

Next, the copy destination data copy program 420 updates the copy destination volume state management table 494 associated with the volume corresponding to the target volume and included in the copy destination and notifies the completion of the copy to the storage apparatus 102 of the copy source (in S1140). Specifically, the copy destination data copy program 420 causes a number (physical page number) of the physical page allocated in S1120 to be stored in the physical page number 812 indicated in a row associated with the logical page of the copy destination and included in the copy destination volume state management table 494 associated with the volume of the copy destination. In addition, the copy destination data copy program 420 sets, to ON, the copied page flag 813 and sets, to OFF, the differential flag 814.

Next, in the storage apparatus 102 of the copy source that has received the notification of the completion of the copy, the copy source data copy program 320 sets, to ON, the copied page flag 803 indicated in a row associated with the target logical page and included in the copy source volume state management table 394 associated with the target volume, sets the post-copy update flag 804 to OFF (in S1150), and terminates the copy source logical page copy process.

Next, a partial copy management table update process is described.

Figure 14:
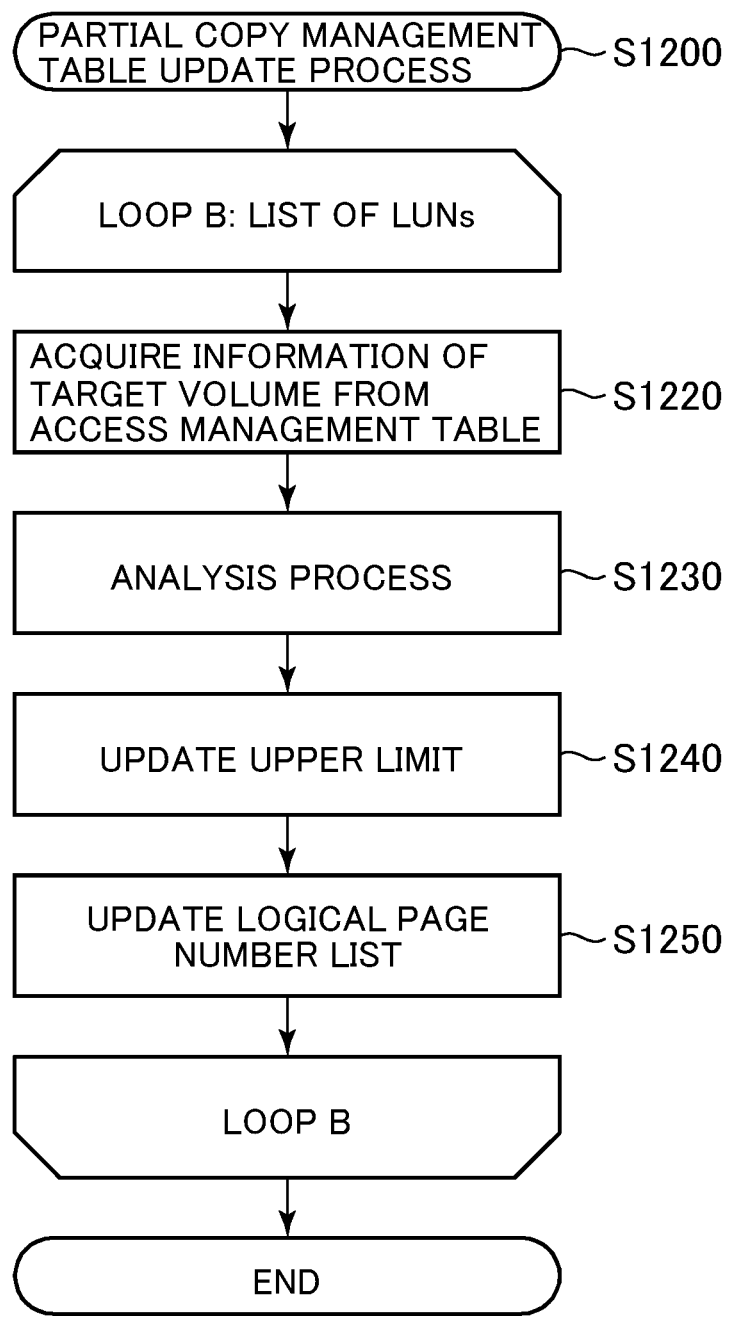
FIG. 14 is a flowchart of a partial copy management table update process according to the embodiment.

FIG. 14 is a flowchart of the partial copy management table update process according to the embodiment.

The partial copy management table update process is executed by the partial copy management table update program 350 (specifically, the CPU 201 that executes the partial copy management table update program 350 of the storage apparatus 102) of the storage apparatus 102 of the copy source.

The partial copy management table update process is executed at predetermined time, or periodically executed, or executed when the administrator performs an operation. The operation of the administrator is received via the network from the management terminal 109 or via a keyboard or mouse connected to the USB device 205 or a display (display with a touch panel) connected to the VGA device 206.

In the partial copy management table update process, first, the partial copy management table update program 350 executes a loop process (in S1220 to S1250) of a loop B on a volume associated with each LUN registered in the copy source volume mapping management table 391. The volume to be processed in this loop process is referred to as target volume.

In the loop process, the partial copy management table update program 350 acquires access management information of the target volume from the copy source access management table 392 and the copy destination access management table 492 (in S1220). The access management information is the number (number of times of reading), indicated in the number of times of reading 603, of times of reading for each logical page of the target volume, the number (number of times of writing), indicated in the number of times of writing 604, of times of writing for each logical page of the target volume, and the like. The access management information may include the other information described with reference to FIG. 7.

Next, the partial copy management table update program 350 executes, based on the acquired access management information, a process of analyzing logical pages to be copied on a priority basis and upper limits on the numbers of logical pages to be copied (in S1230).

As a policy for determining priorities of the logical pages to be copied on a priority basis, the priorities may be determined based on the number of times of access to each page of the volume 105 or the ratio of the number of times of read access to each page of the volume 105 to the number of times of all access to the volume 105. More specifically, for example, a page accessed a large number of times may be prioritized over a page accessed a small number of times, or the priorities may be determined in descending order of number of times of access to each page of the volume 105. Alternatively, the priorities may be determined in descending order of ratio of the number of times of read access to each page of the volume 105 to the number of times of all access to the volume 105, or in descending order of ratio of the amount of accessed data of each page of the volume 105 to the amount of all accessed data of the volume 105, or in descending order of ratio of the amount of data included in each page of the volume 105 and accessed for reading to the amount of all accessed data of the volume 105. In addition, before the volume switching, a page whose writing ratio is low may be prioritized over a page whose writing ratio is high. Furthermore, after the volume switching, differences between the priorities determined for the pages based on writing ratios may be removed.

The upper limit on the number of pages to be copied may be determined based on records of access to the pages of the volume 105 or records of switching from a process for which the volume 105 has been used to a process for which the volume 115 has been used. For example, the number of pages corresponding to a combination of pages covering the number of times of access that is a set percentage (of, for example, 80%) of the number of times of all access to the target volume may be the upper limit on the number of pages to be copied. In addition, the number of pages corresponding to a combination of pages that causes the ratio of the amount of accessed data of the pages to the amount of all accessed data of the volume 105 to be equal to or larger than a predetermined value may be the upper limit on the number of pages to be copied. In addition, the number of pages that do not cause a capacity to be used to store the pages in the public cloud 110 to exceed a storage usage cost set in advance may be determined as the upper limit based on information on a usage fee for a storage capacity to be used in the storage apparatus 112. In addition, a switching record indicated in the switching ON record 506 of the copy source volume mapping management table 391 may be referenced, and the probability at which the switching is set to ON may be analyzed. If the probability is high, the upper limit on the number of pages to be copied may be determined to be a high value. If the probability is low, the upper limit on the number of pages to be copied may be determined to be a low value. In this case, the upper limit on the number of pages to be copied after the volume switching may be determined to be a value equal to or larger than the upper limit on the number of pages to be copied before the volume switching.

Next, the partial copy management table update program 350 causes the upper limit, determined in S1230, on the number of pages to be copied before the volume switching to be stored in the upper limit 703 of the pre-volume-switching sub-table 700 and causes the upper limit, determined in S1230, on the number of pages to be copied after the volume switching to be stored in the upper limit 713 of the post-volume-switching sub-table 710, thereby updating the sub-tables 700 and 710 (in S1240). Next, the partial copy management table update program 350 causes a logical page number list based on the priorities, determined in S1230, of the logical pages for the state before the volume switching to be stored in the logical page number list 702 of the pre-volume-switching sub-table 700 and causes a logical page number list based on the priorities, determined in S1230, of the logical pages for the state after the volume switching to be stored in the logical page number list 712 of the post-volume-switching sub-table 710, thereby updating the sub-tables 700 and 710 (in S1250). This loop process is repeatedly executed for each volume managed by the storage apparatus 102 of the copy source. When the loop process is completely executed on all volumes registered in the copy source volume mapping management table 391, the partial copy management table update process is terminated.

Next, a partial copy management table operation process is described.

Figure 15:
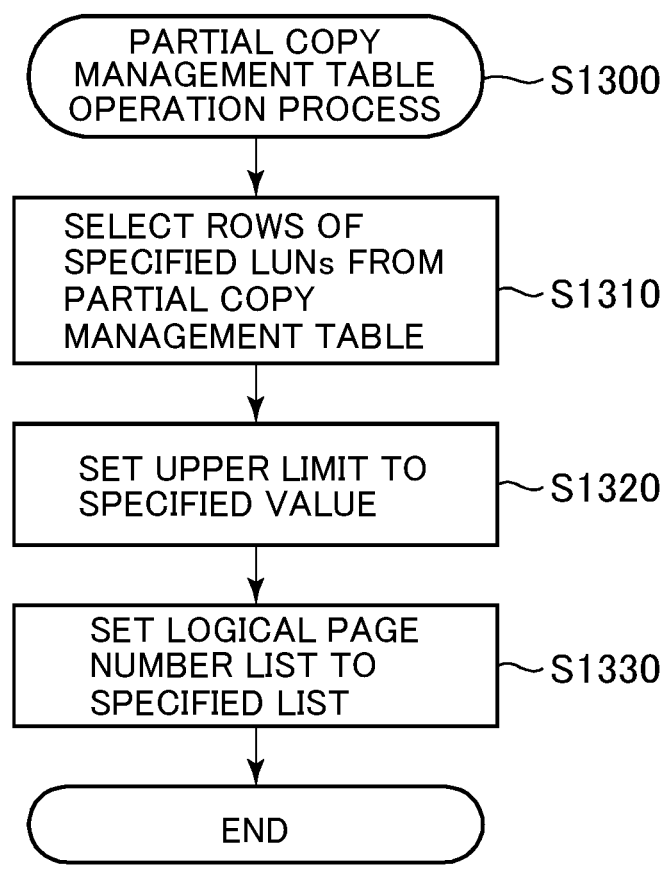
FIG. 15 is a flowchart of a partial copy management table operation process according to the embodiment.

FIG. 15 is a flowchart of the partial copy management table operation process according to the embodiment.

The partial copy management table operation process is executed by the partial copy management table operation program 340 (specifically, the CPU 201 that executes the partial copy management table operation program 340 of the storage apparatus 102) of the storage apparatus 102 of the copy source.

The partial copy management table operation process is executed by an operation of the administrator or by an operation of a user or is called from an application executed in the computer 101 and is executed.

First, the partial copy management table operation program 340 selects rows associated with specified LUNs from the two sub-tables of the partial copy management table 393 (in S1310). Next, the partial copy management table operation program 340 sets values specified by an operator or a calling source in the upper limits 703 and 713 indicated in the selected rows (in S1320). Then, the partial copy management table operation program 340 sets logical page number lists based on priorities specified by the operator or the calling source in the logical page number lists 702 and 712 indicated in the selected rows (in S1330) and terminates the partial copy management table operation process. Although FIG. 15 only shows the setting of the information in the partial copy management table 393, the information can be acquired from the partial copy management table 393 in the same procedure.

Next, a process of switching to the volume of the copy destination is described.

Figure 16:
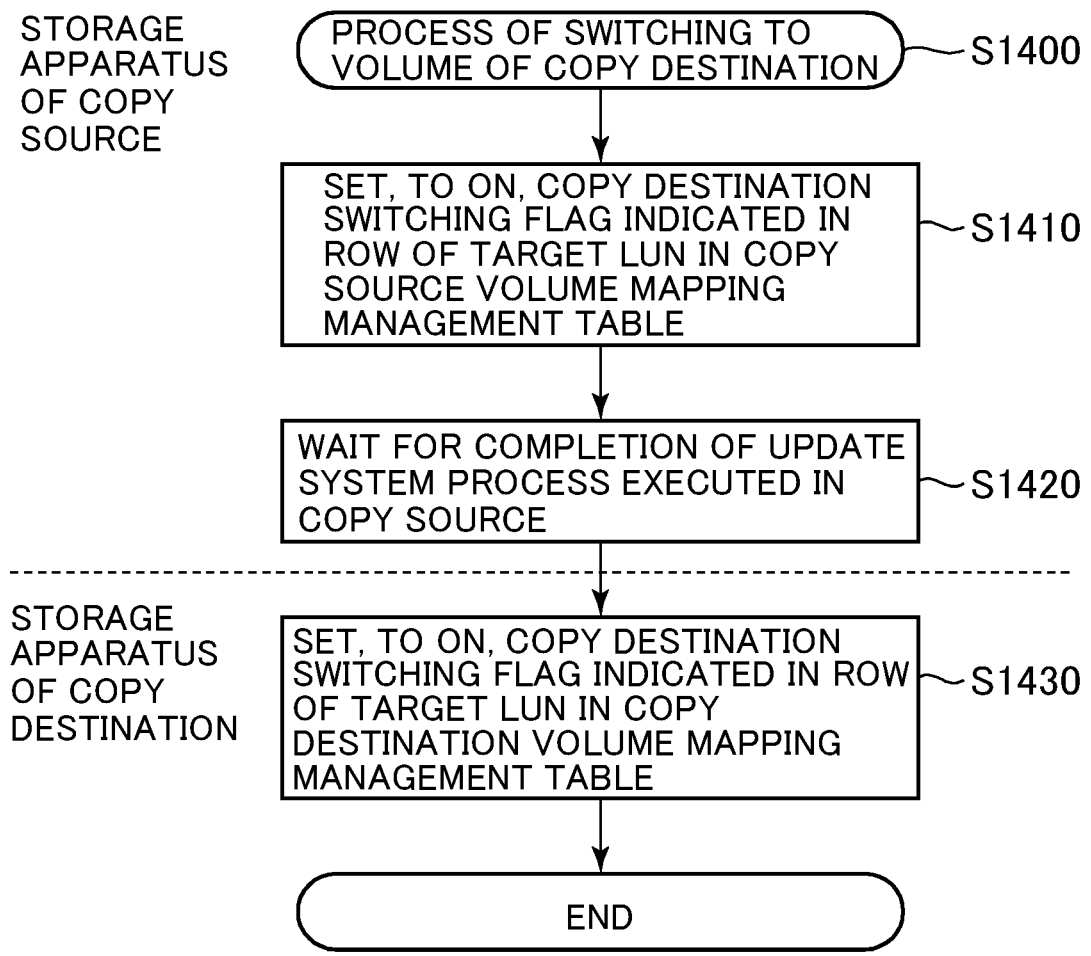
FIG. 16 is a flowchart of a process of switching to a volume of the copy destination according to the embodiment.

FIG. 16 is a flowchart of the process of the switching to the volume of the copy destination according to the embodiment.

The process of the switching to the volume of the copy destination is executed by the copy source volume management program 330 (specifically, the CPU 201 that executes the copy source volume management program 330 of the storage apparatus 102) of the storage apparatus 102 of the copy source and the copy destination volume management program 430 (specifically, the CPU 201 that executes the copy destination volume management program 430 of the storage apparatus 112) of the storage apparatus 112 of the copy destination.

The process of the switching to the volume of the copy destination is executed by the copy source volume management program 330 of the storage apparatus 102 of the copy source when an LUN associated with the volume (referred to as switching target volume in the description of the process of the switching to the volume of the copy destination) to which a volume to be used for a task is to be switched is specified by a calling source (or the computer 101 or the management terminal 109).

First, the copy source volume management program 330 sets, to ON, the copy destination switching flag 504 included in the copy source volume mapping management table 391 and indicated in a row indicating the LUN associated with the switching target volume and adds current time as switching start time to the switching ON record 506 (in S1410). Next, the copy source volume management program 330 waits for the completion of an update system process executed on the switching target volume in the storage apparatus 102 of the copy source (in S1420). In this case, as the update system process, there is a process of reflecting data in the switching target volume if the data to be reflected in the switching target volume is already stored in a cache memory (not shown) in the storage apparatus, for example. Then, when the update system process is completely executed on the switching target volume, the copy source volume management program 330 notifies the switching of the volume to the copy destination volume management program 430.

Next, after the copy destination volume management program 430 receives the notification, the copy destination volume management program 430 sets, to ON, the copy destination switching flag 514 included in the copy destination volume mapping management table 491 and indicated in a row associated with the volume of the copy destination (in S1430) and terminates the process of the switching to the volume of the copy destination.

A process of switching to the volume of the copy destination includes a process to be executed by the computer and is described below.

It is assumed that a certain processing task is executed in the computer 101 installed in the private cloud 100. In the computer 101, an application executing the processing task and an operating system (OS) are executed. The application and the OS that are executed in the computer 101 use the volume 105 of the storage apparatus 102. The computer 101 and the storage apparatus 102 may be configured in a virtual machine (VM) environment or may be configured in a container environment.

A process of executing the volume switching in the computer system 1 is described as follows.

First, the application and OS of the computer 101 are stopped. After that, the process, shown in FIG. 14, of the switching to the volume of the copy destination is executed. Thus, the computer 111 installed in the public cloud 110 can use the switched volume 115 of the storage apparatus 112. After that, the processing task executed in the computer 101 is restarted in the computer 111. Thus, the computer 111 executes a process using the volume 115 of the storage apparatus 112. In this manner, the cloud bursting is started according to the aforementioned procedure.

Next, a process of switching to the volume of the copy source is described.

Figure 17:
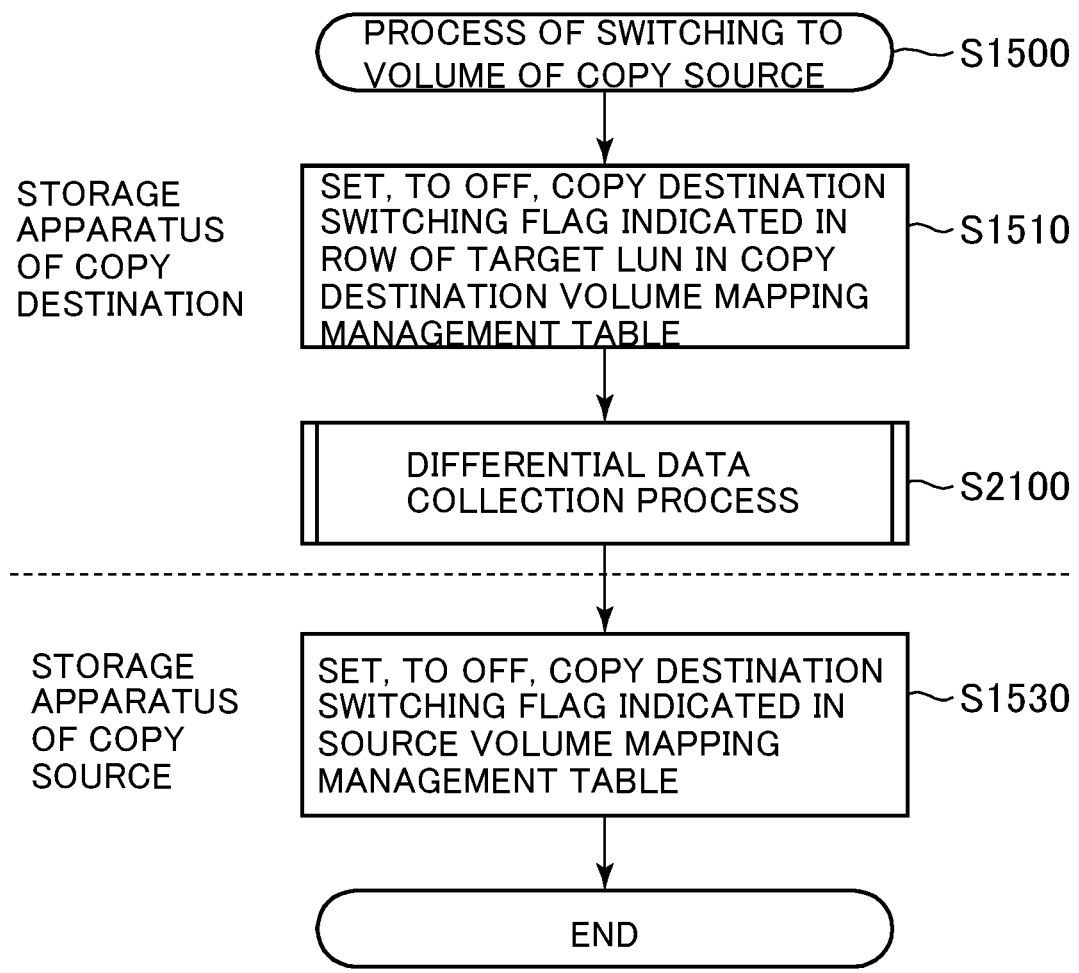
FIG. 17 is a flowchart of a process of switching to a volume of the copy source according to the embodiment.

FIG. 17 is a flowchart of the process of the switching to the volume of the copy source according to the embodiment.

The process of the switching to the volume of the copy source is executed by the copy destination volume management program 430 (specifically, the CPU 201 that executes the copy destination volume management program 430 of the storage apparatus 112) of the storage apparatus 112 of the copy destination and the copy source volume management program 330 (specifically, the CPU 201 that executes the copy source volume management program 330 of the storage apparatus 102) of the storage apparatus 102 of the copy source.

The process of the switching to the volume of the copy source is executed by the copy destination volume management program 430 of the storage apparatus 112 of the copy destination when an LUN associated with the volume (referred to as switching target volume in the description of the process of the switching to the volume of the copy source) to which a volume to be used for a task is to be switched is specified by a calling source (or the computer 101 or the management terminal 109).

First, the copy destination volume management program 430 sets, to OFF, the copy destination switching flag 514 included in the copy destination volume mapping management table 491 and indicated in a row indicating the LUN associated with the switching target volume (in S1510). Next, the copy destination volume management program 430 executes a differential data collection process (refer to FIG. 23) of collecting, in the copy source, data updated in the copy destination (in S2100).

Next, after the execution of the differential data collection process, the copy source volume management program 330 sets, to OFF, the copy destination switching flag 504 included in the copy source volume mapping management table 391 and indicated in a row indicating the volume corresponding to the switching target volume, adds current time as switching end time to the switching ON record 506 (in S1530), and terminates the process of the switching to the volume of the copy source.

A process of switching to the volume of the copy source includes a process to be executed by the computer and is described below.

It is assumed that a certain processing task is executed in the computer 111 installed in the public cloud 110 due to the execution of the cloud bursting.

The process of executing the volume switching in the computer system 1 is described below.

First, an application and OS of the computer 111 are stopped. After that, the process, shown in FIG. 17, of the switching to the volume of the copy source is executed. Thus, the computer 101 installed in the private cloud 100 can use the switched volume 105 of the storage apparatus 102. If the processing task needs to be continuously executed, the processing task executed by the computer 111 is restarted in the computer 101. Thus, the computer 101 executes a process using the volume 105 of the storage apparatus 102. In this manner, the cloud bursting is terminated according to the aforementioned procedure.

Next, a copy source data writing process is described.

Figure 18:
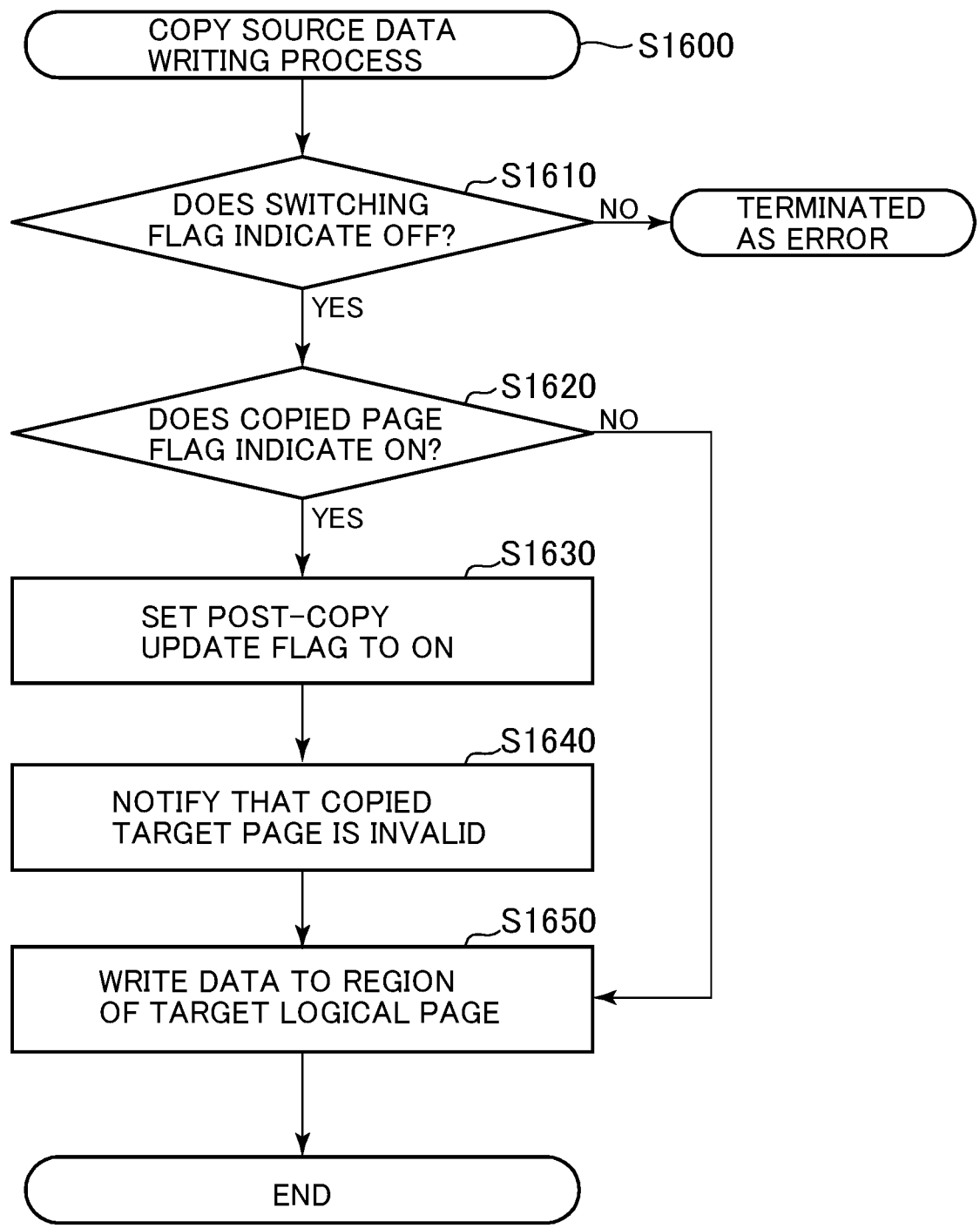
FIG. 18 is a flowchart of a copy source data writing process according to the embodiment.

FIG. 18 is a flowchart of the copy source data writing process according to the embodiment.

The copy source data writing process is executed by the copy source input and output control program 310 (specifically, the CPU 210 that executes the copy source input and output control program 310 of the storage apparatus 102) of the storage apparatus 102 of the copy source when the copy source input and output control program 310 receives a write command (write request) from the computer 101.

When the write command is issued by the computer 101 of the private cloud 100, and the copy source input and output control program 310 of the storage apparatus 102 of the copy source receives the write command, the copy source data writing process is started (in S1600). If data to be written in accordance with the issued write command is larger than a logical page length or crosses a boundary between logical pages, the following steps are executed for each logical page.

First, the copy source input and output control program 310 determines whether or not the copy destination switching flag 504 included in the copy source volume mapping management table 391 and indicated in a row associated with a volume to which the data is to be written in accordance with the write command indicates OFF (in S1610). If the copy destination switching flag 504 indicates ON as a result of the determination (NO in S1610), the copy destination switching flag 504 indicates that a corresponding volume is already used in the public cloud 110, and the copy source input and output control program 310 terminates the process as an error.

On the other hand, if the copy destination switching flag 504 indicates OFF (Yes in S1610), the copy source input and output control program 310 causes the process to proceed to S1620. Next, the copy source input and output control program 310 determines whether or not the copied page flag 803 included in the copy source volume state management table 394 and indicated in a row associated with a logical page (target logical page in the description of the copy source data writing process) to which the data is to be written in accordance with the write command indicates ON (in S1620).

If the copied page flag 803 indicates OFF as a result of the destination (No in S1620), the copied page flag 803 indicates that data of the target logical page is not copied to the public cloud 110, and the copy source input and output control program. 310 causes the process to proceed to S1650 to execute a normal writing process. On the other hand, if the copied page flag 803 indicates ON (Yes in S1620), the copied page flag 803 indicates that the data of the target logical page is already copied to the public cloud 110, and the copy source input and output control program 310 causes the process to proceed to S1630.

The copy source input and output control program 310 sets, to ON, the post-copy update flag 804 included in the copy source volume state management table 394 and indicated in the row associated with the target logical page (in S1630). After that, the copy source input and output control program 310 notifies the storage apparatus 112 of the copy destination that a copied logical page corresponding to the target logical page is invalid (in S1640). As a result, the copy destination input and output control program 410 of the storage apparatus 112 of the copy destination sets, to OFF, the copied page flag 813 included in the copy destination volume state management table 494 and indicated in a row associated with the logical page of the copy destination. After that, the copy source input and output control program 310 writes the data to be written to a storage region of a physical page corresponding to the target logical page (in S1650) and terminates the copy source data writing process.

According to the aforementioned copy source data writing process, if a request to write data to the copied logical page is provided to the storage apparatus 112 of the copy destination, information indicating that data of the logical page corresponding to the storage apparatus 112 of the copy destination is to be changed can be appropriately notified. In the aforementioned example, the information indicating that the copied logical page is invalid is notified. However, every time a write request is provided, data to be written may be transmitted to the storage apparatus 112 of the copy destination and recopied.

Next, a copy source data reading process is described.

Figure 19:
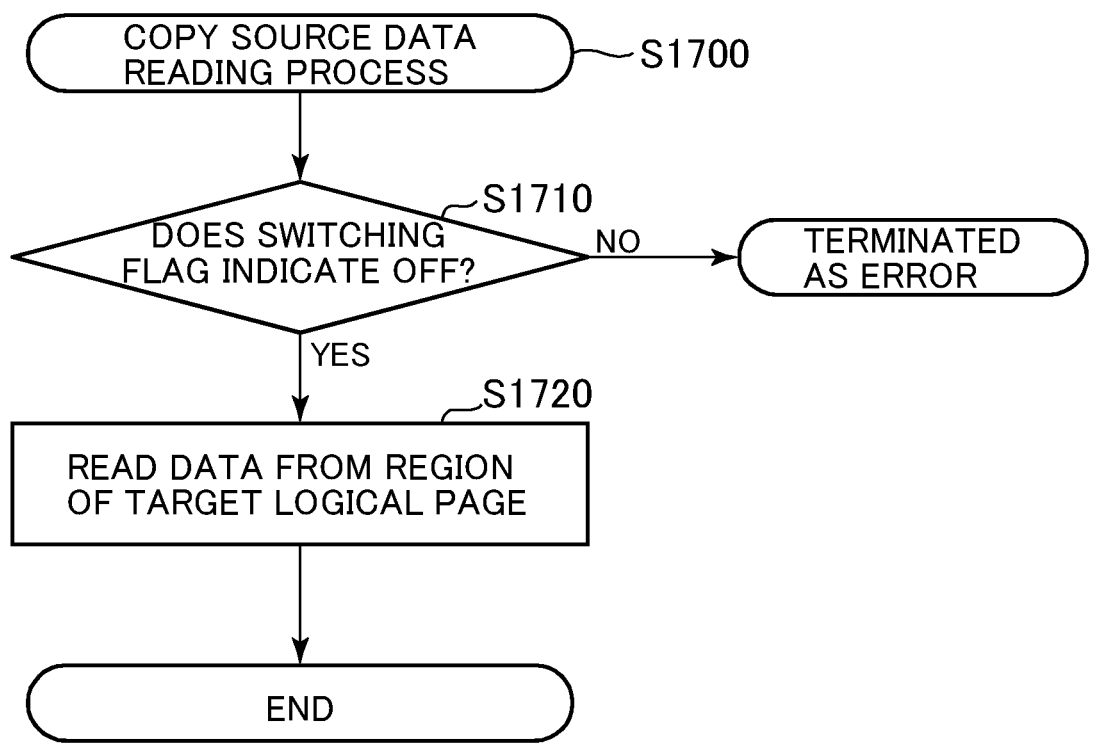
FIG. 19 is a flowchart of a copy source data reading process according to the embodiment.

FIG. 19 is a flowchart of the copy source data reading process according to the embodiment.

When the copy source input and output control program 310 of the storage apparatus 102 of the copy source receives a read command (read request) from the computer 101, the copy source data reading process is executed by the copy source input and output control program 310 (specifically, the CPU 201 that executes the copy source input and output control program 310 of the storage apparatus 102) of the storage apparatus 102 of the copy source.

When the read command is issued by the computer 101 of the private cloud 100, and the copy source input and output control program 310 of the storage apparatus 102 of the copy source receives the read command, the copy source data reading process is started (in S1700). If data to be read in accordance with the read command is larger than a logical page length or crosses a boundary between logical pages, the following steps are executed for each logical page.

First, the copy source input and output control program 310 determines whether or not the copy destination switching flag 504 included in the copy source volume mapping management table 391 and indicated in a row associated with a volume from which the data is to be read indicates OFF (in S1710). If the copy destination switching flag 504 indicates ON (No in S1710), the copy destination switching flag 504 indicates that a corresponding volume is already used in the public cloud 110, and the copy source input and output control program 310 terminates the process as an error.

On the other hand, if the copy destination switching flag 504 indicates OFF (Yes in S1710), the copy source input and output control program 310 causes the process to proceed to S1720. Next, the copy source input and output control program 310 references the copy source volume state management table 394, reads the data from a storage region of a physical page corresponding to a logical page (referred to as target logical page in the description of the copy source data reading process) from which the data is to be read (in S1720). Then, the copy source input and output control program 310 transmits the read data to a requesting source and terminates the copy source data reading process. In the copy source data reading process, if the volume is switched and the command to read the data from the volume is issued after the switching of the volume, the process is terminated as an error. However, if the read command is issued, the process may not be treated as an error, the corresponding data may be read from the storage region and transmitted to the requesting source that has issued the read command. Specifically, a target volume may be used as a snapshot volume immediately before the volume switching, and if a write request is issued, the writing process may be treated as an error, and if a read request is issued, the reading process may be executed.

Next, a copy destination data writing process is described.

Figure 20:
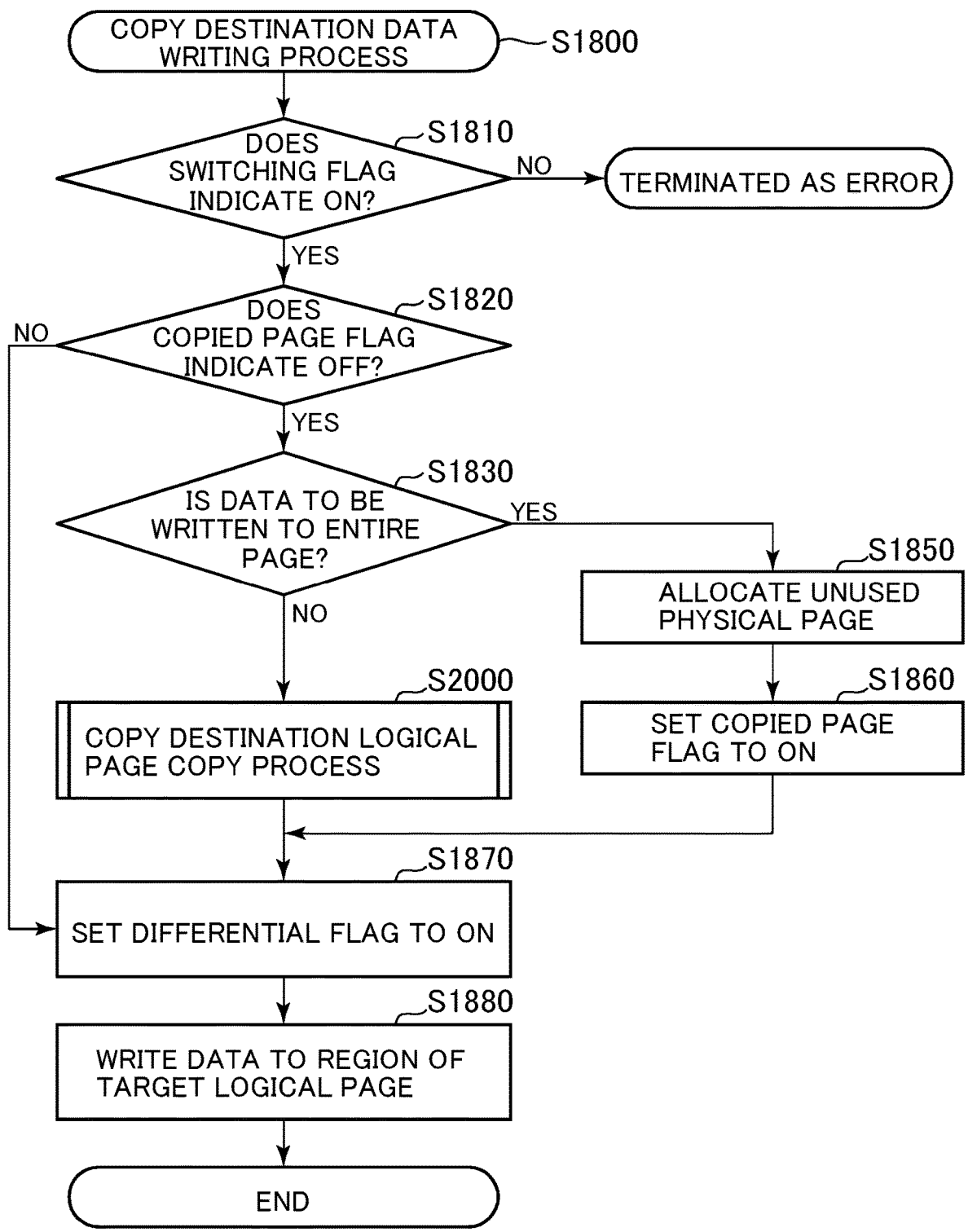
FIG. 20 is a flowchart of a copy destination data writing process according to the embodiment.

FIG. 20 is a flowchart of the copy destination data writing process according to the embodiment.

The copy destination data writing process is executed by the copy destination input and output control program 410 (specifically, the CPU 201 that executes the copy destination input and output control program 410 of the storage apparatus 112) of the storage apparatus 112 of the copy destination when the copy destination input and output control program 410 receives a write command from the computer 111 of the public cloud 110.

When the write command is issued by the computer 111 of the public cloud 110, and the copy destination input and output control program 410 of the storage apparatus 112 of the copy destination receives the write command, the copy destination data writing process is started (in S1800). If data to be written in accordance with the issued write command is larger than a logical page length or crosses a boundary between logical pages, the following steps are executed for each logical page.

First, the copy destination input and output control program 410 determines whether or not the copy destination switching flag 514 included in the copy destination volume mapping management table 491 and indicated in a row associated with a volume to which the data is to be written in accordance with the write command indicates ON (in S1810). If the copy destination switching flag 514 indicates OFF as a result of the destination (No in S1810), the copy destination switching flag 514 indicates that a corresponding volume is currently used in the private cloud 100, and the copy destination input and output control program 410 terminates the process as an error.

On the other hand, if the copy destination switching flag 514 indicates ON (Yes in S1810), the copy destination input and output control program 410 causes the process to proceed to S1820. Next, the copy destination input and output control program 410 determines whether or not the copied page flag 813 included in the copy destination volume state management table 494 and indicated in a row associated with a logical page (target logical page in the description of the copy destination data writing process) to which the data is to be written in accordance with the write command indicates OFF (in S1820).

If the copied page flag 813 indicates OFF as a result of the destination (Yes in S1820), the copied page flag 813 indicates that data of the target logical page is not copied to the public cloud 110, and the copy destination input and output control program 410 causes the process to proceed to S1830 to execute a process of copying to the public cloud 110. On the other hand, if the copied page flag 813 indicates ON (No in S1820), the copied page flag 813 indicates that the data of the target logical page is already copied to the public cloud 110, and the copy destination input and output control program 410 causes the process to proceed to S1870 to execute a normal writing process.

The copy destination input and output control program 410 determines whether or not the data is to be written to the entire logical page in accordance with the write command (in S1830). If the data is to be written to the entire logical page in accordance with the write command (Yes in S1830), the data corresponding to the logical page does not need to be copied in advance, and the copy destination input and output control program 410 causes the process to proceed to S1850. On the other hand, if the data is to be written to a portion of the logical page in accordance with the write command (No in step S1830), the data corresponding to the logical page needs to be copied in advance, and the copy destination input and output control program 410 causes the process to proceed to S2000.

The copy destination input and output control program 410 starts the copy destination logical page copy process (refer to FIG. 22) (in S2000) and causes the process to proceed to S1870 after the process of S2000.

The copy destination input and output control program 410 allocates an unused physical page from a pool or the like (in S1850). Next, the copy destination input and output control program 410 sets a number of the allocated physical page in the physical page number 812 included in the copy destination volume state management table 494 and indicated in the row associated with the logical page of the copy destination, sets the copied page flag 813 to ON (in S1860), and causes the process to proceed to S1870. In this case, the copy destination input and output control program 410 sets, to ON, the copied page flag 813 included in the copy source volume state management table 394 of the storage apparatus 102 and indicated in a row associated with the logical volume included in the copy source and corresponding to the target logical volume. The copy destination input and output control program 410 may notifies the copy source input and output control program 310 of the copy source that the target logical page has been copied, and the copy source input and output control program 310 that has received the notification may set, to ON, the copied page flag 803 included in the copy source volume state management table 394 and indicated in the row associated with the logical page included in the copy source and corresponding to the target logical page.

The copy destination input and output control program 410 sets, to ON, the differential flag 814 included in the copy destination volume state management table 494 and indicated in the row associated with the logical page of the copy destination (in S1870). After that, the copy destination input and output control program 410 writes the data to be written to a storage region of the physical page corresponding to the target logical page (in S1880) and terminates the copy destination data writing process.

Next, a copy destination data reading process is described.

Figure 21:
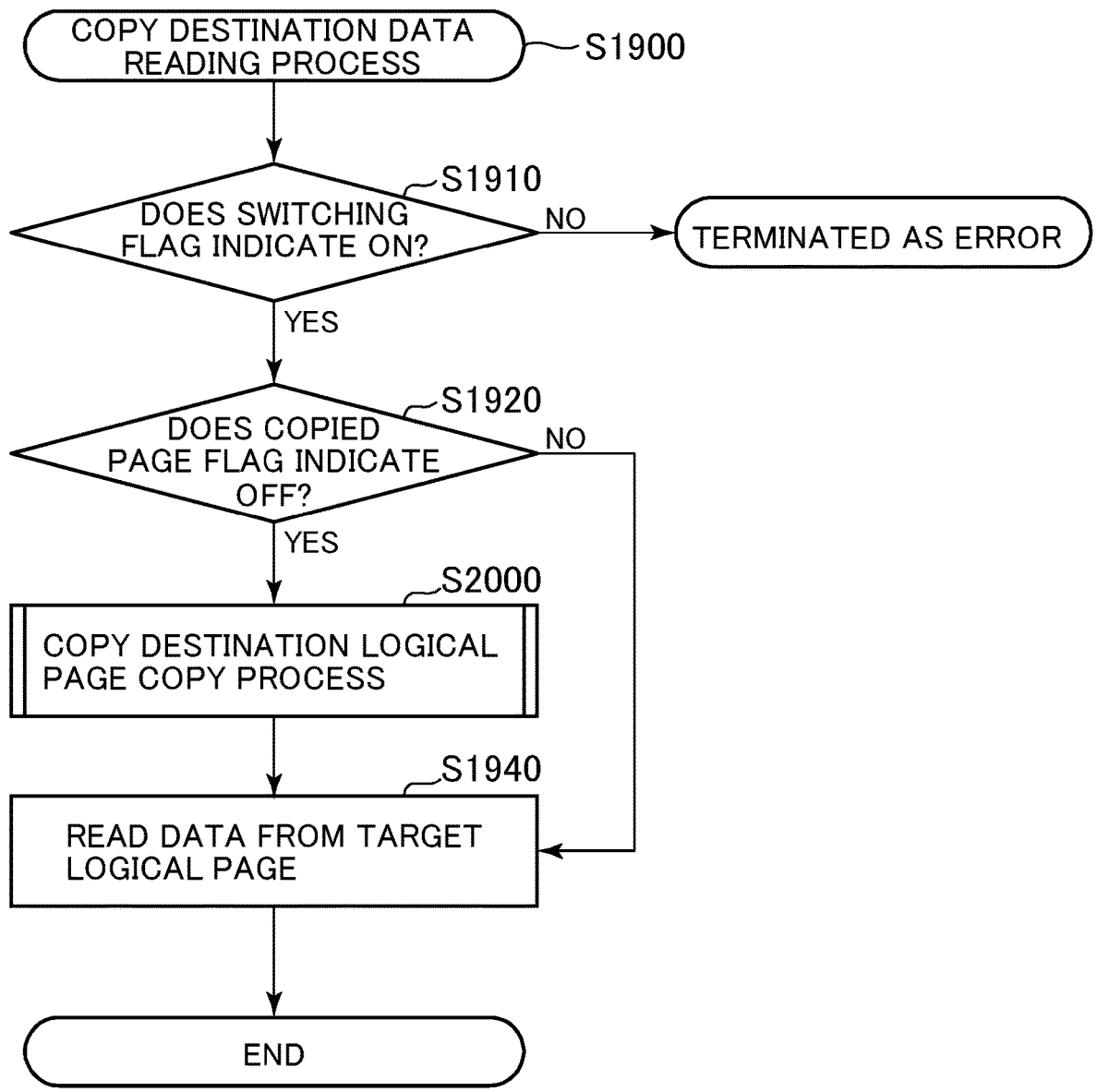
FIG. 21 is a flowchart of a copy destination data reading process according to the embodiment.

FIG. 21 is a flowchart of the copy destination data reading process according to the embodiment.

The copy destination data reading process is executed by the copy destination input and output control program 410 (specifically, the CPU 201 that executes the copy destination input and output control program 410 of the storage apparatus 112) of the storage apparatus 112 of the copy destination when the copy destination input and output control program 410 receives a read command from the computer 111 of the public cloud 110.

When the read command is issued by the computer 111 of the public cloud 110, and the copy destination input and output control program 410 of the storage apparatus 112 of the copy destination receives the read command, the copy destination data reading process is started (in S1900). If data to be read in accordance with the issued read command is larger than the logical page length or crosses a boundary between logical pages, the following steps are executed for each logical page.

First, the copy destination input and output control program 410 determines whether or not the copy destination switching flag 514 included in the copy destination volume mapping management table 491 and indicated in a row associated with a volume from which the data is to be read in accordance with the read command indicates ON (in S1910). If the copy destination switching flag 514 indicates OFF as a result of the determination (No in S1910), the copy destination switching flag 514 indicates that a corresponding volume is currently used in the private cloud 100, and the copy destination input and output control program 410 terminates the process as an error.

On the other hand, if the copy destination switching flag 514 indicates ON (Yes in S1910), the copy destination input and output control program 410 causes the process to proceed to S1920. Next, the copy destination input and output control program 410 determines whether or not the copied page flag 813 included in the copy destination volume state management table 494 and indicated in a row associated with a logical page (target logical page in the description of this process) from which the data is to be read in accordance with the read command indicates OFF (in S1920).

If the copied page flag 813 indicates OFF as a result of the determination (Yes in S1920), the copied page flag 813 indicates that the data of the target logical page is not copied to the public cloud 110, and the copy destination input and output control program 410 causes the process to proceed to S2000 to execute a process of copying to the public cloud 110.

The copy destination input and output control program 410 starts the copy destination logical page copy process (refer to FIG. 22) (in S2000).

After S2000 is executed or if the copied page flag 813 indicates ON (No in S1920), the data of the target logical page is already copied to the public cloud 110, and the copy destination input and output control program 410 causes the process to proceed to S1940 to execute a normal reading process. The copy destination input and output control program 410 reads the data from a storage region of a physical page corresponding to the target logical page (in S1940), transmits the read data to a requesting source, and terminates the copy destination reading process. In the aforementioned copy destination data reading process, if the command to read the data from the volume is issued after the switching of the volume, the process is terminated as an error. However, if the read command is issued, the process may not be terminated as an error, the corresponding data may be read from the storage region and may be transmitted to the requesting source that has issued the read command. Specifically, the target volume may be used as a snapshot volume before the volume switching, and if a write request is issued, the writing process may be treated as an error, and if a read request is issued, the reading process may be executed.

Next, the copy destination logical page copy process is described.

FIG. 22 is a flowchart of the copy destination logical page copy process according to the embodiment.

The copy destination logical page copy process is executed in S2000 shown in FIGS. 20 and 21. The copy destination logical page copy process is executed by the copy destination input and output control program 410 (specifically, the CPU 201 that executes the copy destination input and output control program 410 of the storage apparatus 112) of the storage apparatus 112 of the copy destination and the copy source input and output control program 310 (specifically, the CPU 201 that executes the copy source input and output control program 310 of the storage apparatus 102) of the storage apparatus 102 of the copy source.

First, the copy destination input and output control program 410 of the storage apparatus 112 of the copy destination requests the copy source input and output control program 310 of the storage apparatus 102 of the copy source to transmit data of a target logical page (corresponding to the target logical page shown in FIGS. 20 and 21) of a target volume (in S2010).

The copy source input and output control program 310 of the storage apparatus 102 of the copy source receives the request and changes, to ON, the copied page flag 803 indicating the target logical page and included in the copy source volume state management table 394 associated with the target volume (in S2020). After that, the copy source input and output control program 310 references a physical page number indicated in the physical page number 802 of the copy source volume state management table 394, acquires data of the target logical page, and transmits the read data to the copy destination input and output control program 410 of the copy destination (in S2030).

Upon receiving the data of the target logical page, the copy destination input and output control program 410 of the storage apparatus 112 of the copy destination allocates an unused physical page from a pool (in S2040). The copy destination input and output control program 410 writes the received data to the allocated physical page (in S2050). Next, the copy destination input and output control program 410 updates a row associated with the target logical page and included in the copy destination volume state management table 494 associated with the target volume (in S2060) and terminates the process. Specifically, the copy destination input and output control program 410 causes a number (physical page number) of the allocated physical page to be stored in the physical page number 812 indicated in the row associated with the target logical volume, sets the copied page flag 813 to ON, and sets the differential flag 814 to OFF. After that, the copy destination input and output control program 410 terminates the process.

Logical pages newly stored in the public cloud 110 by the copy destination logical page copy process may be treated as a target to which an upper limit on the number of pages copiable from the copy source to the copy destination is applied or may be excluded from the target. If the logical pages are treated as the target to which the upper limit is applied, and the number of logical pages that is indicated in the number of copied pages 515 indicated in the copy destination volume mapping management table 491 and indicating a corresponding volume reaches an upper limit on the number of pages of a target volume managed in an applied sub-table of the partial copy management table 393, a logical page that is accessed at a low frequency in the public cloud 110 may be released in the public cloud 110.

Next, a differential data collection process is described.

FIG. 23 is a flowchart of the differential data collection process according to the embodiment.

The differential data collection process is executed by the copy destination data copy program 420 (specifically, the CPU 201 that executes the copy destination data copy program 420 of the storage apparatus 112) of the storage apparatus 112 of the copy destination and the copy source data copy program 320 (specifically, the CPU 201 that executes the copy source data copy program 320 of the storage apparatus 102) of the storage apparatus 102 of the copy source.

The differential data collection process is called in S2100 included in the process, shown in FIG. 17, of the switching to the volume of the copy source.

First, the copy destination data copy program 420 of the storage apparatus 112 of the copy destination executes a loop process of a loop C on logical pages (referred to as target logical pages in the description of this process) for which flags indicated in the differential flag 814 of the copy destination volume state management table 494 associated with the volume to be switched indicate ON.

The copy destination data copy program 420 transmits data of the target logical pages to the copy source (in S2120). The copy source data copy program 320 of the storage apparatus 102 of the copy source receives the data, references the copy source volume state management table 394, writes the received data to physical pages corresponding to the target logical pages, and returns a response indicating the completion of the writing to the copy destination data copy program 420 (in S2130). The copy destination data copy program 420 receives the response indicating the completion of the writing and executes the loop process on the next target logical page. If the loop process is executed on all the target logical pages for which the flags indicated in the differential flag 814 indicate ON, the copy destination data copy program 420 terminates the differential data collection process. The differential data collection process shown in FIG. 23 is executed to transmit data for each logical page, but may be executed to collectively transmit data of multiple target logical pages to the copy source.

The invention is not limited to the aforementioned embodiment and may be modified without departing from the gist of the invention.

For example, in the embodiment, an upper limit on the number of copiable pages is determined and the pages are copied using priorities. The pages, however, may be copied in accordance with the upper limit regardless of the priorities. The upper limit may not be set and the pages may be sequentially copied based on the priorities. For example, if the upper limit is set, it is possible to suppress a storage capacity required for the storage apparatus of the copy destination and improve the processing efficiency of the computer. In addition, for example, if the pages are copied based on the priorities, and the process of switching a volume is executed during the copy of pages, a page necessary for the storage apparatus of the copy destination is likely to exist, and the processing efficiency of the computer can be improved.

In addition, the embodiment describes, as an example, the bursting in which a process of a certain volume 105 is taken over from the private cloud 100 to the public cloud 110 and executed. The invention, however, is applicable to a computer system including a computer for executing a process using a certain volume and another computer for executing a process using another volume (for example, a volume of the same contents) corresponding to the certain volume.

In addition, in the embodiment, a part or all of the processes executed by the CPU may be executed by a dedicated hardware circuit. In addition, the programs described in the embodiment may be installed from a program source. The program source may be a program distribution server or a storage medium (for example, a portable non-transitory storage medium).

What is claimed is:

1. A computer system comprising a first storage apparatus that provides a first volume to a first computer,
    wherein a second storage apparatus is able to provide a second volume to a second computer,
    wherein the first storage apparatus provides data to the second computer by causing a virtualization function to point to the first volume from the second volume and copying the data from the first volume to the second volume,
    wherein an upper limit on the amount of data copiable from the first volume of the first apparatus to the second volume of the second storage apparatus is set, and
    wherein a processor unit of the first storage apparatus copies data in an amount equal to or smaller than the upper limit from a storage region forming the first volume to a storage region forming the second volume of the second storage apparatus, wherein the processor unit of the first storage apparatus determines the upper limit based on any of information on a usage fee for a storage capacity to be used for the second storage apparatus, a record of access to the first volume, and a record of switching from a process using the first volume to a process using the second volume.

2. The computer system according to claim 1,
    wherein the processor unit of the first storage apparatus changes the upper limit at predetermined time.

3. The computer system according to claim 1,
    wherein the processor unit of the first storage apparatus determines that the upper limit is an upper limit corresponding to a combination of storage regions causing the ratio of the number of times of access to the storage regions to the number of times of all access to the first volume to be equal to or larger than a predetermined value or is an upper limit corresponding to a combination of storage regions causing the ratio of the amount of data corresponding to access to the storage regions to the amount of data corresponding to all the access to the first volume to be equal to or larger than a predetermined value.

4. The computer system according to claim 1,
    wherein priority information on priorities that are provided for multiple storage regions forming the first volume of the first storage apparatus and are used upon copying to the second volume of the second storage apparatus is set, and
    wherein the processor unit of the first storage apparatus copies, in accordance with the priority information, data of the multiple storage regions forming the first volume to storage regions corresponding to storage regions forming the second volume of the second storage apparatus.

5. The computer system according to claim 1,
    wherein a processor unit of the second storage apparatus causes writing identification information to be stored, the writing identification information identifying at least one storage region to which data has been written in the second volume upon the process using the second volume, and
    wherein upon switching from the process using the second volume to the process using the first volume, the processor unit of the second storage apparatus copies the data written to the storage region of the second volume of the second storage apparatus to a storage region corresponding to a storage region of the first volume.

6. A computer system comprising a first storage apparatus that provides a first volume to a first computer,
    wherein a second storage apparatus is able to provide a second volume to a second computer,
    wherein the first storage apparatus provides data to the second computer by causing a virtualization function to point to the first volume from the second volume and copying the data from the first volume to the second volume,
    wherein an upper limit on the amount of data copiable from the first volume of the first apparatus to the second volume of the second storage apparatus is set, and
    wherein a processor unit of the first storage apparatus copies data in an amount equal to or smaller than the upper limit from a storage region forming the first volume to a storage region forming the second volume of the second storage apparatus, wherein the computer system switches a predetermined process between a process using the first volume and a process using the second volume, wherein as the upper limit, a first upper limit for the process using the first volume and a second upper limit for the process using the second volume are determined, wherein the processor unit of the first storage apparatus determines whether or not the predetermined process is executed using any of the first volume and the second volume, and wherein the processor unit of the first storage apparatus determines, based on the result of determination, any of the first upper limit and the second upper limit as the upper limit to be used.

7. The computer system according to claim 6, wherein the second upper limit is larger than the first upper limit.

8. A storage apparatus that provides a first volume to a computer, wherein a second volume corresponding to the first volume is able to be provided to another computer from another storage apparatus, wherein an upper limit on the amount of data copiable from the first volume to the second volume of the other storage apparatus is set based on any of information on a usage fee for a storage capacity to be used for the second storage apparatus, a record of access to the first volume, and a record of switching from a process using the first volume to a process using the second volume, and wherein a processor unit of the storage apparatus copies data in an amount equal to or smaller than the upper limit from a storage region forming the first volume to a storage region forming the second volume of the other storage apparatus.

9. A volume management method by a computer system including a first storage apparatus that provides a first volume to a first computer, wherein a second storage apparatus is able to provide a second volume to a second computer, wherein an upper limit on the amount of data copiable from the first volume of the first storage apparatus to the second volume of the second storage apparatus is set based on any of information on a usage fee for a storage capacity to be used for the second storage apparatus, a record of access to the first volume, and a record of switching from a process using the first volume to a process using the second volume, wherein the first storage apparatus provides data to the second computer by causing a virtualization function to point to the first volume from the second volume and copying the data from the first volume to the second volume, and wherein the first storage apparatus copies data in an amount equal to or smaller than the upper limit from a storage region forming the first volume to a storage region forming the second volume of the second storage apparatus.

* * * * *